US012119534B2

(12) United States Patent
Hamano

(10) Patent No.: US 12,119,534 B2
(45) Date of Patent: Oct. 15, 2024

(54) WILKINSON POWER DIVIDER, WILKINSON POWER COMBINER, AND AMPLIFIER

(71) Applicant: SUMITOMO ELECTRIC INDUSTRIES, LTD., Osaka (JP)

(72) Inventor: Koshi Hamano, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 394 days.

(21) Appl. No.: 17/457,774

(22) Filed: Dec. 6, 2021

(65) Prior Publication Data

US 2022/0255210 A1 Aug. 11, 2022

(30) Foreign Application Priority Data

Feb. 9, 2021 (JP) ................................ 2021-018975

(51) Int. Cl.
*H01P 5/18* (2006.01)

(52) U.S. Cl.
CPC .................................... *H01P 5/185* (2013.01)

(58) Field of Classification Search
CPC ...... H01P 5/16; H01P 5/19; H01P 3/08; H01P 5/04; H01P 1/213; H01P 5/12; H01P 5/184; H01P 1/32; H01P 5/185; H01P 1/36; H01P 5/10; H01P 5/107; H01P 5/18
See application file for complete search history.

(56) References Cited

U.S. PATENT DOCUMENTS

| | | | | |
|---|---|---|---|---|
| 6,437,806 | B1 | 8/2002 | Iwasa | |
| 9,667,216 | B2 * | 5/2017 | Szopko | H04B 1/0458 |
| 10,930,995 | B2 * | 2/2021 | Yoshioka | H01P 5/16 |
| 2022/0158322 | A1 * | 5/2022 | Kim | H01P 5/16 |

FOREIGN PATENT DOCUMENTS

| | | |
|---|---|---|
| JP | H11-330813 | 11/1999 |
| JP | 2002-217615 | 8/2002 |

* cited by examiner

*Primary Examiner* — Lincoln D Donovan
*Assistant Examiner* — Tyler J Pereny
(74) *Attorney, Agent, or Firm* — IPUSA, PLLC

(57) ABSTRACT

A Wilkinson power divider includes an input line, a first branching line and a second branching line branching from the input line, a first output line coupled to a first end of an output side of the first branching line, a second output line coupled to a second end of an output side of the second branching line, a first stub coupled to the first end, a second stub coupled to the second end, an isolation resistor coupled between the first stub and the second stub, and a circuit branching from a first point between two ends of the first stub, and a second point between two ends of the second stub, and coupling between the first point and the second point. At least a portion of the first stub, at least a portion of the second stub, and the first circuit form a resonant circuit.

17 Claims, 15 Drawing Sheets

10

WILKINSON POWER DIVIDER, WILKINSON POWER COMBINER, AND AMPLIFIER

CROSS-REFERENCE TO RELATED APPLICATIONS

This application is based upon and claims priority to Japanese Patent Application No. 2021-018975 filed on Feb. 9, 2021, the entire contents of which are incorporated herein by reference.

BACKGROUND OF THE INVENTION

1. Field of the Invention

The present disclosure relates to Wilkinson power dividers, Wilkinson power combiners, and amplifiers. Wilkinson power dividers are sometimes also referred to as Wilkinson power splitters, or simply Wilkinson dividers or Wilkinson splitters. Wilkinson power combiners are sometimes also simply referred to as Wilkinson combiners.

2. Description of the Related Art

Conventionally, there is a Wilkinson power divider which includes 2 branching lines split from an input line, and 2 output lines connected to output terminals of the 2 branching lines, respectively. An isolation resistor is connected between the 2 output terminals via a connection line for the isolation resistor. Because the connection line deteriorates the reflection characteristic and the isolation characteristic of the Wilkinson power divider, a capacitor is inserted between the isolation resistor and the connection line, and 2 short stubs are connected to the 2 output terminals, respectively, to cancel the reactance of the connection line, as described in Japanese Laid-Open Patent Publication No. 2002-217615, for example.

Another example of the conventional Wilkinson power divider is described in Japanese Laid-Open Patent Publication No. H11-330813, for example.

Conventional Wilkinson power dividers adjust the impedance using a short stub connected to the output terminal, separately from the short stubs which are connected to cancel the reactance of the connection line. However, such a short stub for adjusting the impedance has a high reactance, thereby making it difficult to efficiently adjust the impedance. If the impedance cannot be adjusted efficiently, the isolation of the Wilkinson power divider deteriorates and affects the passband characteristic, which in turn may narrow the passband of a transmission signal. Similar problems may also occur in Wilkinson power combiners.

SUMMARY OF THE INVENTION

Accordingly, one object of the present disclosure is to provide a Wilkinson power divider, a Wilkinson power combiner, and an amplifier having a broadened frequency band.

According to one aspect of the present disclosure, a Wilkinson power divider of the present disclosure includes an input line; a first branching line and a second branching line branching from the input line; a first output line coupled to a first end of an output side of the first branching line; a second output line coupled to a second end of an output side of the second branching line; a first stub coupled to the first end; a second stub coupled to the second end; an isolation resistor coupled between the first stub and the second stub; and a first circuit branching from a first point between two ends of the first stub, and a second point between two ends of the second stub, and coupling between the first point and the second point, wherein at least a first portion of the first stub, at least a first portion of the second stub, and the first circuit form a first resonant circuit.

Other objects and further features of the present disclosure will be apparent from the following detailed description when read in conjunction with the accompanying drawings.

DETAILED DESCRIPTION

Figure 1:
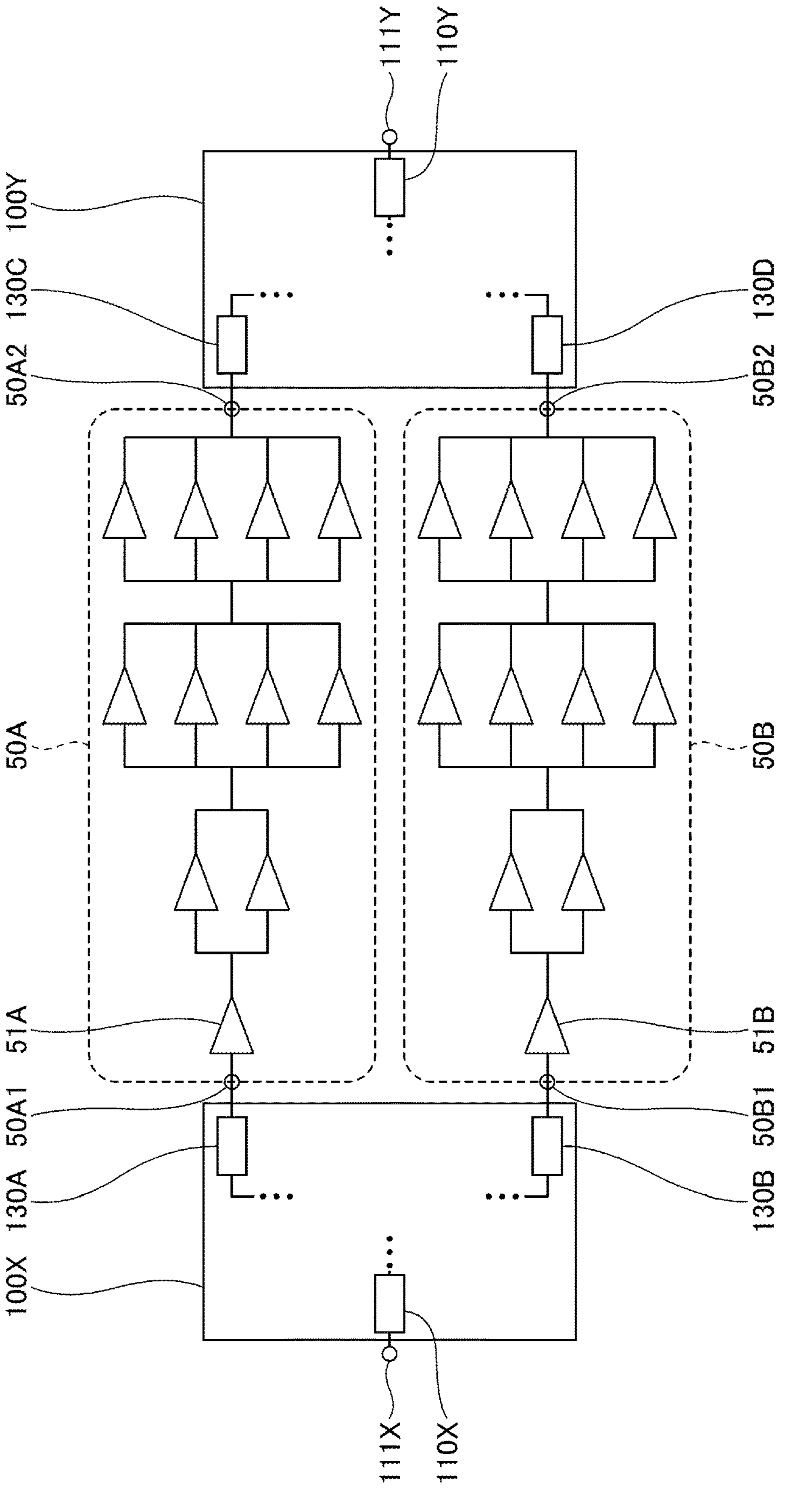
FIG. 1 is a diagram illustrating an example of a configuration of a power amplifier including a Wilkinson power divider and a Wilkinson power combiner according to a first embodiment.

Embodiments of the present disclosure are described below.

Description of Embodiments of the Present Disclosure

[1] A Wilkinson power divider according to one aspect of the present disclosure may include an input line; a first branching line and a second branching line branching from the input line; a first output line coupled to a first end of an output side of the first branching line; a second output line coupled to a second end of an output side of the second branching line; a first stub coupled to the first end; a second stub coupled to the second end; an isolation resistor coupled between the first stub and the second stub; and a first circuit branching from a first point between two ends of the first stub, and a second point between two ends of the second stub, and coupling between the first point and the second point, wherein at least a first portion of the first stub, at least a first portion of the second stub, and the first circuit form a first resonant circuit.

Because at least the first portion of the first stub and at least the first portion of the second stub form a portion of the first resonant circuit, at least the first portion of the first stub and at least the first portion of the second stub can be effectively utilized to efficiently adjust the impedance. As a result, it is possible to improve the isolation characteristics, and broaden the frequency band of the Wilkinson power divider. Hence, it is possible to provide a broadband Wilkinson power divider.

[2] In [1] above, a first resonant frequency of the first resonant circuit may be different from a center frequency of a transmission signal input to the input line. When the first resonant frequency is different from the center frequency, it is possible to further improve the isolation characteristics, and further broaden the frequency band of the Wilkinson power divider. Hence, it is possible to provide a broadband Wilkinson power divider.

[3] In [2] above, a first frequency band, including the first resonant frequency, and in which the first resonant circuit resonates, may be different from a frequency band including the center frequency of the transmission signal input to the input line. When the first frequency band is different from the frequency band including the center frequency, it is possible to further improve the isolation characteristics, and further broaden the frequency band of the Wilkinson power divider. Hence, it is possible to provide a broadband Wilkinson power divider by utilizing the first frequency band different from the center frequency.

[4] In [3] above, a transmission coefficient of the transmission signal in the frequency band including the center frequency, the first frequency band, and a frequency band between the frequency band including the center frequency and the first frequency band, may be less than or equal to a predetermined value. In this case, it is possible to obtain a continuous frequency band in which the transmission coefficient is sufficiently large in the frequency band including the center frequency, the first frequency band, and the frequency band between the frequency band between the frequency band including the center frequency and the first frequency band, thereby enabling the frequency band of the Wilkinson power divider to be broadened.

[5] In [3] or [4] above, the first circuit may include a first line coupling between the first point and the second point, and a first capacitor inserted in series with respect to the first line, and the first frequency band may be determined by a reactance of at least the first portion of the first stub, at least the first portion of the second stub, and the first line, and an electrostatic capacitance of the first capacitor. When the first frequency band is determined by utilizing the reactance of at least the first portion of the first stub, and at least the first portion of the second stub, it is possible to minimize the reactance of the first line to be added in order to determine the first frequency band.

[6] In [5] above, the first resonant circuit may be an LCL filter formed by at least the first portion of the first stub, at least the first portion of the second stub, the first line, and the first capacitor. When the first resonant circuit is the LCL filter, it is possible to reduce the generation of harmonics, and effectively improve the isolation between the first end and the second end.

[7] In any one of [1] to [6] above, the first point may be a middle point between the two ends of the first stub, and the second point may be a middle point between the two ends of the second stub. When the first point is the middle point between the two ends of the first stub, and the second point is the middle point between the two ends of the second stub, it means that the resonant circuit included in the Wilkinson power divider is only the first resonant circuit, because the two ends of the first stub on both sides of the first point, and the two ends of the second stub on both sides of the second point, are included in the first resonant circuit. For this reason, it is possible to efficiently broaden the frequency band of the Wilkinson power divider using a simple configuration.

[8] In any one of [1] to [7] above, the first circuit may be disposed on the same side as the first branching line and the second branching line, with respect to the first stub, the isolation resistor, and the second stub. When the first circuit can be disposed in a region surrounded by the first stub, the isolation resistor, the second stub, the first branching line, and the second branching line, it is possible to reduce the size of the Wilkinson power divider.

[9] In any one of [1] to [6] above, the Wilkinson power divider may further include a second circuit branching from a third point between the two ends of the first stub, and a fourth point between the two ends of the second stub, and coupling between the third point and the fourth point, and at least a second portion of the first stub other than the first portion of the first stub, at least a second portion of the second stub other than the first portion of the second stub, and the second circuit may form a second resonant circuit which resonates in a second frequency band different from the frequency band including the center frequency.

Because at least the second portion of the first stub and at least the second portion of the second stub form a portion of the second resonant circuit, at least the second portion of the first stub and at least the second portion of the second stub may be utilized to efficiently adjust the impedance, in addition to the adjustment of the impedance by the first resonant circuit. Further, the second resonant circuit resonates in the second frequency band different from the frequency band including the center frequency of the transmission signal input to the input line. Accordingly, it is possible to efficiently further broaden the frequency band of the Wilkinson power divider.

[10] In [9] above, a second resonant frequency of the second resonant circuit may be different from the center frequency of the transmission signal input to the input line. When the second resonant frequency is different from the center frequency, is possible to further improve the isolation characteristics, and further broaden the frequency band of the Wilkinson power divider. Hence, it is possible to provide a broadband Wilkinson power divider.

[11] In [10] above, a second frequency band, including the second resonant frequency, and in which the second resonant circuit resonates, may be different from a frequency band including the center frequency of the transmission signal. When the second frequency band is different from the frequency band including the center frequency, is possible to further improve the isolation characteristics, and further broaden the frequency band of the Wilkinson power divider. Hence, it is possible to provide a broadband Wilkinson power divider.

[12] In any one of [3] to [5] above, the Wilkinson power divider may further include a second circuit branching from a third point between the two ends of the first stub, and a fourth point between the two ends of the second stub, and coupling between the third point and the fourth point, at least a second portion of the first stub other than the first portion of the first stub, at least a second portion of the second stub other than the first portion of the second stub, and the second circuit may form a second resonant circuit which resonates in a second frequency band different from the frequency band including the center frequency, the frequency band including the center frequency may be between the first frequency band and the second frequency band, and a transmission coefficient of the transmission signal in the frequency band including the center frequency, the first frequency band, the second frequency band, a frequency band between the frequency band including the center frequency and the first frequency band, and a frequency band between the frequency band including the center frequency and the second frequency band, may be less than or equal to a predetermined value. In this case, it is possible to obtain a continuous frequency band in which the transmission coefficient is less than or equal to the predetermined value and sufficiently small in the frequency band from the frequency band including the center frequency, the first frequency band, the second frequency band, the frequency band between the frequency band including the center frequency and the first frequency band, and the frequency band between the frequency band including the center frequency and the second frequency band, and broaden the frequency band of the Wilkinson power divider.

[13] In [11] or [12] above, the second circuit may include a second line coupling between the third point and the fourth point, and a second capacitor inserted in series with respect to the second line, and the second frequency band may be determined by a reactance of at least the second portion of the first stub, at least the second portion of the second stub, and the second line, and an electrostatic capacitance of the second capacitor. When the second frequency band is determined by utilizing the reactance of at least the second portion of the first stub, and at least the second portion of the second stub, it is possible to minimize the reactance of the second line to be added in order to determine the second frequency band.

[14] In [13] above, the second resonant circuit may be an LCL filter formed by at least the second portion of the first stub, at least the second portion of the second stub, the second line, and the second capacitor. When the second resonant circuit is the LCL filter, it is possible to reduce the generation of harmonics, and effectively improve the isolation between the first end and the second end.

[15] In any one of [9] to [14] above, the first circuit may be disposed on the side opposite from the first branching line and the second branching line, with respect to the first stub, the isolation resistor, and the second stub, and the second circuit may be disposed on the same side as the first branching line and the second branching line, with respect to the first stub, the isolation resistor, and the second stub. When the second circuit can be disposed in a region surrounded by the first branching line, the second branching line, the first stub, the second stub, and the isolation resistor, it is possible to effectively utilize the area on a substrate or the like on which the Wilkinson power divider is formed, and reduce the size of the Wilkinson power divider.

[16] In [15] above, the two ends of the first stub may include a first connection terminal coupled to the first end, and a third connection terminal coupled to the isolation resistor, the two ends of the second stub may include a second connection terminal coupled to the second end, and a fourth connection terminal coupled to the isolation resistor, the first point and the third point may be provided in this order from the first connection terminal to the third connection terminal, and the second point and the fourth point may be provided in this order from the second connection terminal to the fourth connection terminal. With respect to the first stub and the second stub, the second circuit is connected at a position closer to the isolation resistor than the first circuit, and thus, it is possible to provide a sufficiently large spacing between the second circuit and the first branching line and the second branching line, and reduce the coupling between the second circuit and the first branching line and the second branching line. As a result, it is possible to obtain a Wilkinson power divider having excellent impedance characteristics.

[17] In [16] above, a length between the first connection terminal and the first point may be a first length corresponding to the first resonant frequency of the first resonant circuit, a length between the first point and the third point may be a total length of the first length, and a second length corresponding to the second resonant frequency of the second resonant circuit, a length between the third point and the third connection terminal may be the second length, a length between the second connection terminal and the second point may be the first length, a length between the second point and the fourth point may be a total length of the first length and the second length, and a length between the fourth point and the fourth connection terminal may be the second length. When the lengths are set in such a manner, it means that the resonant circuits included in the Wilkinson power divider are only the first resonant circuit and the second resonant circuit, because the first stub and the second stub in their entirety will be included in the first resonant circuit and the second resonant circuit. For this reason, it is possible to more finely adjust the impedance using the 2 resonant circuits, and further broaden the frequency band of the Wilkinson power divider.

[18] In [17] above, the first length may be longer than the second length. In this case, it is possible to further separate the second circuit from the first branching line and the second branching line, and further reduce the coupling between the second circuit and the first branching line and the second branching line. As a result, it is possible to obtain a Wilkinson power divider having more excellent impedance characteristics.

[19] A Wilkinson power combiner according to one aspect of the present disclosure may include an output line; a first merging line and a second merging line merging to the output line; a first input line coupled to a first input end of the first merging line; a second input line coupled to a second input end of the second merging line; a third stub coupled to the first input end; a fourth stub coupled to the second input end; an isolation resistor coupled between the third stub and the fourth stub; and a third circuit branching from a fifth point between two ends of the third stub, and a sixth point between two ends of the fourth stub, and coupling between the fifth point and the sixth point, wherein at least a portion of the third stub, at least a portion of the fourth stub, and the third circuit form a third resonant circuit.

Because at least a portion of the third stub and at least a portion of the fourth stub form a portion of the third resonant circuit, at least the portion of the third stub and at least the portion of the fourth stub can be effectively utilized to efficiently adjust the impedance. As a result, it is possible to improve the isolation characteristics, and broaden the frequency band of the Wilkinson power combiner. Accordingly, it is possible to provide a broadband Wilkinson power combiner.

[20] An amplifier according to one aspect of the present disclosure may include the Wilkinson power divider described in [1] above; the Wilkinson power combiner described in [19] above; a first amplifier unit coupled between the first branching line and the first merging line; and a second amplifier unit coupled between the second branching line and the second merging line.

In the Wilkinson power divider connected to the input side of the first amplifier unit and the second amplifier unit, at least a portion of the first stub and at least a portion of the second stub form a portion of the first resonant circuit which resonates in the first frequency band different from the frequency band including the center frequency of the transmission signal input to the input line. Moreover, in the Wilkinson power combiner connected to the output side of the first amplifier unit and the second amplifier unit, at least a portion of the third stub and at least a portion of the fourth stub form a portion of the third resonant circuit which resonates in the first frequency band. For this reason, at least a portion of the first stub, at least a portion of the second stub, at least a portion of the third stub, and at least a portion of the fourth stub may be effectively utilized to efficiently adjust the impedance. As a result, it is possible to improve the isolation characteristics, and broaden the frequency band of the amplifier. Accordingly, it is possible to provide a broadband amplifier.

Details of Embodiments of the Present Disclosure

Embodiments of the present disclosure will now be described in detail, but the present disclosure is not limited to these embodiments. In the present specification and the drawings, constituent elements having substantially the same functional configurations are designated by the same reference numerals, and a repeated description thereof will be omitted.

First Embodiment

[Configuration of Power Amplifier 10]

FIG. 1 is a diagram illustrating an example of a configuration of a power amplifier 10 including a Wilkinson power divider 100X according to the first embodiment, and a Wilkinson power combiner 100Y according to the first embodiment. The power amplifier 10 is an example of an amplifier. In FIG. 1, illustration of detailed circuit configurations of the Wilkinson power divider 100X and the Wilkinson power combiner 100Y will be omitted.

The power amplifier 10 is provided in a mobile base station, for example, and amplifies radio waves (or transmission signals) to be transmitted to a terminal, such as a smartphone or the like. In the mobile base station which transmits transmission signals in a plurality of frequency bands (multi-band transmission), the power amplifier 10 is required to have a broad frequency band (broadband) in order to enable the amplification of the transmission signals in the plurality of frequency bands using a single power amplifier 10, for example.

The power amplifier 10 includes the Wilkinson power divider 100X, amplifier units 50A and 50B, and the Wilkinson power combiner 100Y. The amplifier unit 50A is an example of a first amplifier circuit, and the amplifier unit 50B is an example of a second amplifier circuit.

The amplifier unit 50A has an input terminal 50A1, an output terminal 50A2, and amplifiers 51A. The amplifier unit 50B has an input terminal 50B1, an output terminal 50B2, and amplifiers 51B. The number of amplifiers 51A provided in the amplifier unit 50A, and the number of amplifiers 51B provided in the amplifier unit 50B, are both 11, for example. The 11 amplifiers 51A are connected in 4 stages, from an input side (left side in FIG. 1) to an output side (right side in FIG. 1) of the amplifier unit 50A. Similarly, the 11 amplifiers 51B are connected in 4 stages, from an input side (left side in FIG. 1) to an output side (right side in FIG. 1) of the amplifier unit 50B.

In the amplifier unit 50A, 1, 2, 4, and 4 amplifiers 51A are provided in the first through fourth stages, respectively, when viewed from the input side, for example. In FIG. 1, if each amplifier 51A has an input terminal on the left side and an output terminal on the right side, the input terminal of the 1 amplifier 51A in the first stage is connected to the input terminal 50A1, and the output terminals of the 4 amplifiers 51A in the fourth stage are connected to the output terminal 50A2. In the amplifier unit 50A, the input terminals of the 2 amplifiers 51A in the second stage are connected to the output terminal of the 1 amplifier 51A in the first stage, and the input terminals of the 4 amplifiers 51A in the third stage are connected to the output terminals of the 2 amplifiers 51A in the second stage, and the input terminals of the 4 amplifiers 51A in the fourth stage are connected to the output terminals of the 4 amplifiers 51A in the third stage.

The configuration of the amplifier unit 50A including the amplifiers 51A described above is similarly applicable to the amplifier unit 50B including the amplifiers 51B. The input terminal of the 1 amplifier 51B in the first stage is connected to the input terminal 50B1. The output terminals of the 4 amplifiers 51B in the fourth stage are connected to the output terminal 50B2.

The amplifiers 51A and 51B may be formed by Gallium Nitride High Electron Mobility Transistor (GaN HEMTs), for example. The power amplifier 10 may be used to amplify transmission signals in frequency bands including the E-band (frequency band of 5 GHz from 71 GHz to 76 GHz, and frequency band of 5 GHz from 81 GHz to 86 GHz), for example. The transmission signals in the E-band are transmission signals in an extremely high frequency band (frequency band from approximately 30 GHz to approximately 300 GHz, for example, sometimes also referred to as millimeter wave band or millimeter band). Because the power amplifier 10 is provided in the mobile base station, for example, a configuration, in which the GaN HEMTs are connected in series in a plurality of stages by taking into consideration the frequency characteristics of the GaN HEMTs, is employed to increase the amplification factor of the transmission signal to be transmitted. A description will be given of an example in which each of the amplifier units 50A and 50B has a configuration including 4 stages. From a viewpoint of increasing the amplification factor, a configuration including 2 or more stages connected in series is preferable, however, each of the amplifier units 50A and 50B may include an arbitrary number of stages connected in series. In addition, the transmission signals are not limited to the transmission signals in the extremely high frequency band, and may be in a microwave band (frequency band from approximately 3 GHz to approximately 30 GHz, for example).

The Wilkinson power divider 100X includes an input line 110X, and output lines 130A and 130B. The input line 110X includes an input terminal 111X. The Wilkinson power combiner 100Y includes an output line 110Y, and input lines 130C and 130D. The output line 110Y includes an output terminal 111Y. The output lines 130A and 130B of the Wilkinson power divider 100X are connected to the input terminals 50A1 and 50B1 of the amplifier units 50A and 50B, respectively. The input lines 130C and 130D of the Wilkinson power combiner 100Y are connected to the output terminals 50A2 and 50B2 of the amplifier units 50A and 50B, respectively.

From a viewpoint of reducing mutual electromagnetic interference (or radio frequency interference), in a plan view, the amplifier units 50A and 50B may be arranged at a spacing (spacing separating the amplifier units 50A and 50B along a vertical direction in FIG. 1) of approximately one wavelength at the center frequency of the transmission signal. For this reason, the output lines 130A and 130B, and the input lines 130C and 130D, have certain lengths. Because the lengths of the output lines 130A and 130B, and the input lines 130C and 130D, are preferably short from a viewpoint of obtaining an excellent transmission characteristic of the power amplifier 10, the Wilkinson power divider 100X and the Wilkinson power combiner 100Y are configured to shorten the lengths of the output lines 130A and 130B, and the input lines 130C and 130D, as will be described later in the specification.

In the power amplifier 10 having the configuration described above, the transmission signal input to the input terminal 111X is divided by the Wilkinson power divider 100X, amplified by the amplifier units 50A and 50B, combined by the Wilkinson power combiner 100Y, and output from the output terminal 111Y.

[Configuration of Wilkinson Power Divider 100X]

Figure 2:
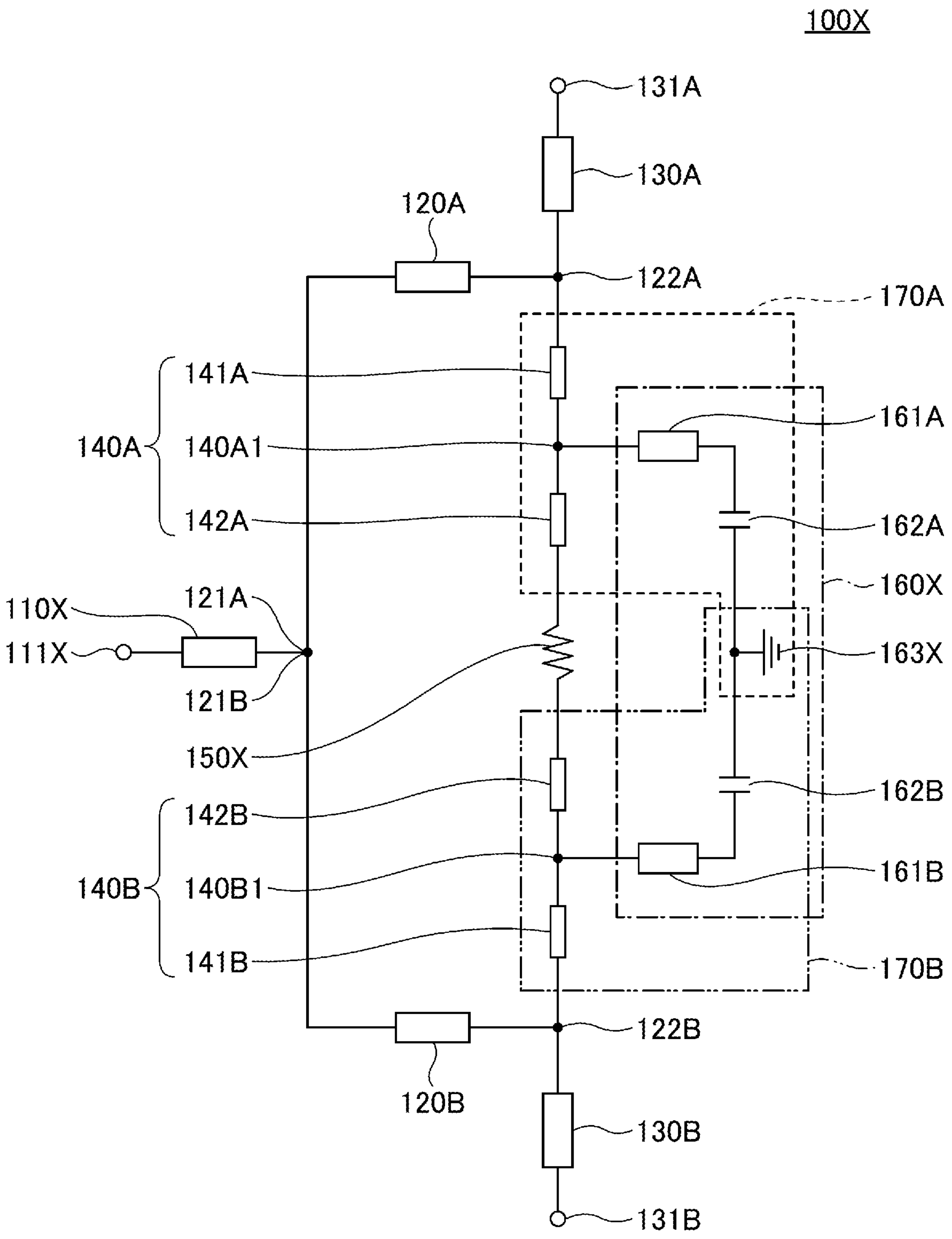
FIG. 2 is a diagram illustrating an example of a configuration of the Wilkinson power divider according to the first embodiment.

FIG. 2 is a diagram illustrating an example of a configuration of the Wilkinson power divider 100X. The Wilkinson power divider 100X includes the input line 110X, branching lines 120A and 120B, the output lines 130A and 130B, stubs 140A and 140B, an isolation resistor 150X, and a circuit 160X. The Wilkinson power divider 100X also includes resonant circuits 170A and 170B. The branching line 120A is an example of a first branching line, and branching line 120B is an example of a second branching line. The output line 130A is an example of a first output line, and the output line 130B is an example of a second output line. The stub 140A is an example of a first stub, and the stub 140B is an example of a second stub. The circuit 160X is an example of a first circuit. A circuit including a combination of the resonant circuits 170A and 170B is an example of a first resonant circuit.

Among the constituent elements of the Wilkinson power divider 100X, the input line 110X, the branching lines 120A and 120B, the output lines 130A and 130B, the stubs 140A and 140B, and lines 161A and 161B of the circuit 160X may be formed by microstrip lines. Accordingly, a conductive layer (ground layer) having a ground potential is provided on a first surface of a substrate, on an opposite side of a second surface of the substrate on which the Wilkinson power divider 100X is formed. It is assumed in the following description that the center frequency of the transmission signal divided by the Wilkinson power divider 100X is 83 GHz included in the E-band, for example, and the center frequency of the transmission signal divided by the Wilkinson power divider 100X will hereinafter simply be referred to as the center frequency.

The input line 110X is a line connecting the input terminal 111X to the branching lines 120A and 120B. A characteristic impedance Z0 of the input line 110X may be 50Ω, for example. An output end of the input line 110X is connected to each of input ends 121A and 121B of the branching lines 120A and 120B. The input ends 121A and 121B may be located at the same position.

The branching lines 120A and 120B branch from the output end of the input line 110X. The branching line 120A has the input end 121A, and an output end 122A. The output end 122A is an example of a first end. A length (electrical length) of the branching line 120A may be ¼ of an electrical length λe of the wavelength at the center frequency, that is, λe/4, for example. The characteristic impedance of the branching line 120A may be √2×Z0. Because Z0 is 50Ω, √2×Z0 is approximately 70Ω. The branching line 120B has the input end 121B, and an output end 122B. The output end 122B is an example of a second end. A length and the characteristic impedance of the branching line 120B may be the same as the length and the characteristic impedance of the branching line 120A.

In order to minimize the lengths of the output lines 130A and 130B, the output ends 122A and 122B of the branching lines 120A and 120B are positioned close to the input terminals 50A1 and 50B1 of the amplifier units 50A and 50B illustrated in FIG. 1. According to this configuration, the output ends 122A and 122B become separated from the isolation resistor 150X, and thus, the stubs 140A and 140B are provided between the isolation resistor 150X and the output ends 122A and 122B, respectively. If such a configuration were not employed and the stubs 140A and 140B were not provided, the lengths of the output lines 130A and 130B would become approximately half-wavelength at the center frequency, and the isolation of the Wilkinson power divider 100X may deteriorate to affect the passband characteristics and narrow the passband of the transmission signal.

However, because the provision of the stubs 140A and 140B will deteriorate the isolation characteristic between the output end 122A and the output end 122B, the Wilkinson power divider 100X according to the present embodiment uses the resonant circuits 170A and 170B in order to improve the isolation characteristics. Details of resonant circuits 170A and 170B will be described later in the specification.

The output line 130A has an input end connected to the output end 122A of the branching line 120A, and an output terminal 131A. The output terminal 131A is connected to the input terminal 50A1 of the amplifier unit 50A illustrated in FIG. 1. Similarly, the output line 130B has an input end connected to the output end 122B of the branching line 120B, and an output terminal 131B. The output terminal 131B is connected to the input terminal 50B1 of the amplifier unit 50B illustrated in FIG. 1.

The stub 140A connects between the output end 122A and the isolation resistor 150X. The stub 140A may have a constant width and a constant thickness between two ends thereof. In this example, the stub 140A may be described separately for lines 141A and 142A. For example, the lines 141A and 142A may have the same length and the same reactance. A point 140A1 between the lines 141A and 142A is a mid point between the two ends of the stub 140A, and is an example of a first point. A length of the stub 140A may be in a range of approximately ⅛ to approximately ¼ of the electrical length λe of the wavelength at the center frequency, for example. The first point between two ends of the first stub does not include the two ends of the stub 140A, and refers to a position along a longitudinal direction of the stub 140A other than the two ends of the stub 140A. In the first embodiment, the point 140A1, which is the example of the first point, is the mid point between the two ends of the stub 140A, for example.

The stub 140B connects between the output end 122B and the isolation resistor 150X. The stub 140B may have a constant width and a constant thickness between two ends thereof. In this example, the stub 140B may be described separately for lines 141B and 142B. For example, the length of the stub 140B may be the same as the length of the stub 140A. In addition, the lines 141B and 142B may have the same length which is the same as the length of the lines 141A and 142A, for example. For this reason, the lines 141B and 142B may have the same reactance which is the same as the reactance of the lines 141A and 142A, for example. A point 140B1 between the lines 141B and 142B is a mid point between the two ends of the stub 140B, and is an example of a second point. The second point between two ends of the second stub does not include the two ends of the stub 140B, and refers to a position along a longitudinal direction of the stub 140B other than the two ends of the stub 140B. In the first embodiment, the point 140B1, which is the example of the second point, is the mid point between the two ends of the stub 140B, for example.

The isolation resistor 150X is provided between the stubs 140A and 140B. The isolation resistor 150X is provided to ensure isolation between the output ends 122A and 122B. A resistance value of the isolation resistor 150X may be 100Ω, for example. Various resistors may be used for the isolation resistor 150X, but in this example, a resistor made of GaAs, for example, is used for the isolation resistor 150X.

The circuit 160X includes the lines 161A and 161B, capacitors 162A and 162B, and a ground terminal 163X. In FIG. 2, the lines 161A and 161B are illustrated by blocks, but the line 161A connects between the point 140A1 and the ground terminal 163X, and the line 161B connects between the point 140B1 and the ground terminal 163X. For this reason, the capacitors 162A and 162B are actually inserted in series with respect to the lines 161A and 161B, respectively. For example, the lines 161A and 161B may have the same length, and the same reactance. A single line, which is a combination of the lines 161A and 161B, is an example of a first line. Further, the capacitors 162A and 162B may have the same electrostatic capacitance. The circuit 160X may have a configuration which is symmetrical with respect to the ground terminal 163X between the points 140A1 and 140B1.

The resonant circuit 170A is a circuit formed by the lines 141A and 142A of stub 140A, and the line 161A, the capacitor 162A, and the ground terminal 163X of the circuit 160X, and forms an LCL filter. In other words, the resonant circuit 170A has a function to attenuate signal components near a desired resonant frequency. A reactance (L) included in the resonant circuit 170A is the reactance of the lines 141A and 142A and the line 161A, and an electrostatic capacitance (C) of the resonant circuit 170A is the electrostatic capacitance of the capacitor 162A.

The resonant circuit 170B is a circuit formed by the lines 141B and 142B of stub 140B, and the line 161B, the capacitor 162B, and the ground terminal 163X of the circuit 160X, and forms an LCL filter. In other words, the resonant circuit 170B has a function to attenuate the signal components near the desired resonant frequency. A reactance (L) included in the resonant circuit 170B is the reactance of the lines 141B and 142B and the line 161B, and an electrostatic capacitance (C) of the resonant circuit 170B is the electrostatic capacitance of the capacitor 162B.

In this example of the present embodiment, the resonant frequencies of the resonant circuits 170A and 170B are the same, because the reactances of the lines 141A, 142A, 141B, and 142B are all the same, the reactances of the lines 161A, 161B are the same, and the electrostatic capacitances of the capacitors 162A and 162B are the same. When the resonant frequencies of the resonant circuits 170A and 170B are denoted by f1, the resonant circuits 170A and 170B have the function to attenuate the signal components near the resonant frequency f1. The resonant frequency f1 is an example of a first resonant frequency. A frequency band including the resonant frequency f1 is an example of a first frequency band, and is a frequency band (lower than 71 GHz) lower than or a frequency band (higher than 86 GHz) higher than the E-band which is the frequency band including the center frequency. As an example, it is assumed that the resonant frequency f1 is 58 GHz, and that the frequency band including the resonant frequency f1 is a frequency band from 56 GHz to 61 GHz. Thus, the frequency band including the resonant frequency f1 is different from the E-band, which is the frequency band including the center frequency. In addition, the resonant frequency f1 is different from the center frequency.

With regard to the stub 140A which is the example of the first stub, and the stub 140B which is the example of the second stub, "at least a portion of the first stub" and "at least a portion of the second stub" are to be interpreted as follows. In other words, a phrase "at least a portion of the first stub, at least a portion of the second stub, and the first circuit form the first resonant circuit" covers a case where the entire stub 140A and the entire stub 140B and the first circuit (circuit 160X) form the first resonant circuit (resonant circuits 170A and 170B). In the first embodiment, the entire stub 140A and the entire stub 140B are used to form the resonant circuits 170A and 170B.

[Configuration of Wilkinson Power Combiner 100Y]

Figure 3:
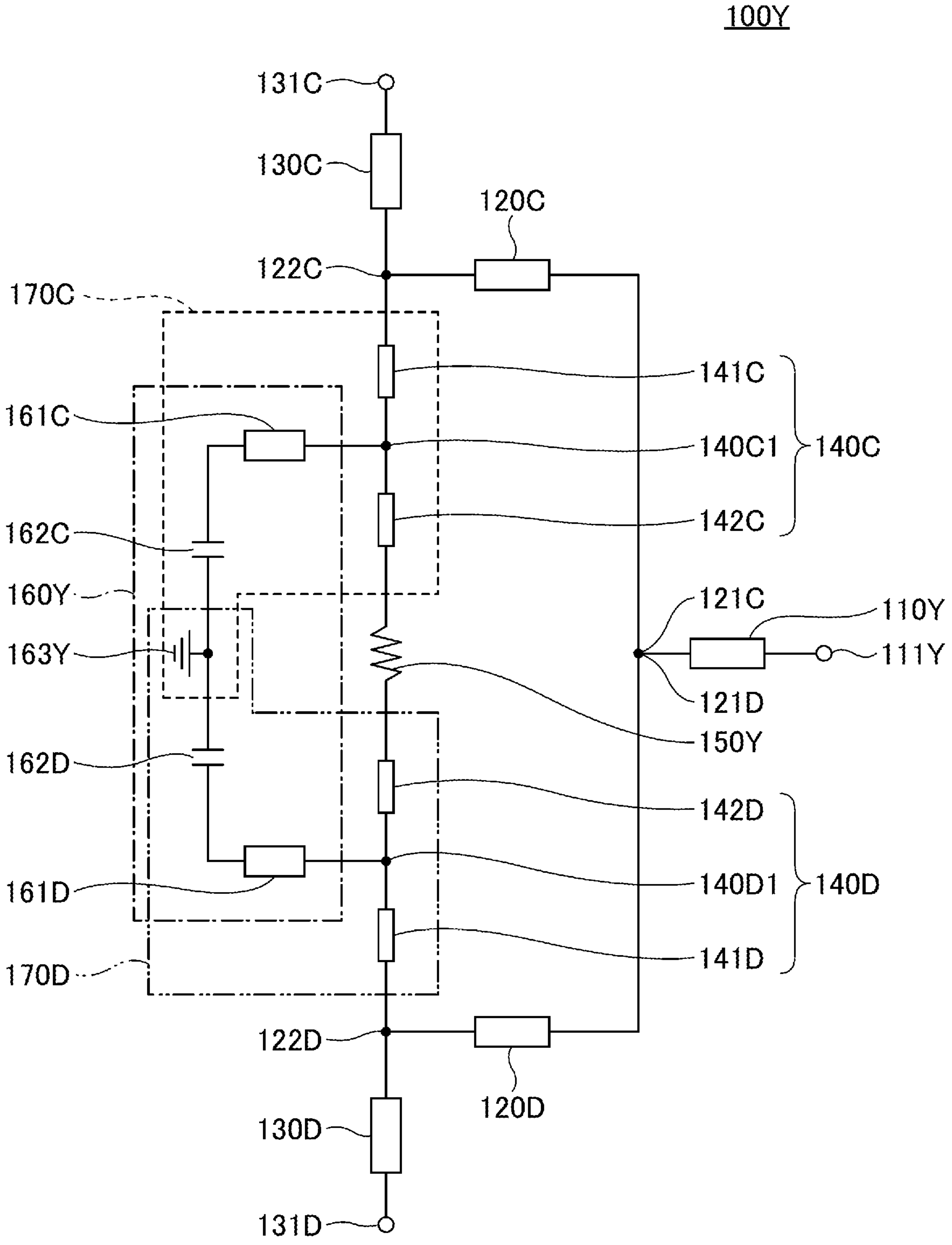
FIG. 3 is a diagram illustrating an example of a configuration of the Wilkinson power combiner according to the first embodiment.

FIG. 3 is a diagram illustrating an example of a configuration of the Wilkinson power combiner 100Y. The Wilkinson power combiner 100Y has a configuration in which the left and right sides of the Wilkinson power divider 100X illustrated in FIG. 2 are reversed.

The Wilkinson power combiner 100Y includes the output line 110Y, merging lines 120C and 120D, the input lines 130C and 130D, stubs 140C and 140D, an isolation resistor 150Y, and a circuit 160Y. The Wilkinson power combiner 100Y also includes resonant circuits 170C and 170D. The merging line 120C is an example of a first merging line, and the merging line 120D is an example of a second merging line. The input line 130C is an example of a first input line, and the input line 130D is an example of a second input line. The stub 140C is an example of a third stub, and the stub 140D is an example of a fourth stub. The circuit 160Y is an example of a third circuit. A circuit including a combination of the resonant circuits 170C and 170D is an example of a third resonant circuit.

Among constituent elements of the Wilkinson power combiner 100Y, the lines 161C and 161D of the output line 110Y, the merging lines 120C and 120D, the input lines 130C and 130D, the stubs 140C and 140D, and the circuit 160Y may be famed by microstrip lines. Accordingly, a conductive layer (ground layer) having a ground potential is provided on a first surface of a substrate, on an opposite side of a second surface of the substrate on which the Wilkinson power combiner 100Y is formed. It is assumed in the following description that the center frequency of the transmission signals combined by the Wilkinson power combiner 100Y is the same as the center frequency of the transmission signal divided by the Wilkinson power divider 100X.

The output line 110Y is a line connecting the output terminal 111Y to the merging lines 120C and 120D. An input end of the output line 110Y is connected to output ends 121C and 121D of the merging lines 120C and 120D, respectively. The output ends 121C and 121D may be located at the same position.

The merging lines 120C and 120D merge at the input end of the output line 110Y. The merging line 120C has the output end 121C, and an input end 122C. The input end 122C is an example of a first end of the merging line 120C. The length (electrical length) of the merging line 120C is the same as the lengths of the branching lines 120A and 120B, and may be ¼ of the electrical length λe of the wavelength at the center frequency, that is, λe/4, for example. The characteristic impedance of the merging line 120C may be $\sqrt{2}\times Z0$, which is approximately 70Ω. The merging line 120D has the output end 121D, and an input end 122D. The input end 122D is an example of a second end of the merging line 120D. The length of the merging line 120D may be the same as the length of the merging line 120C.

In order to minimize the lengths of the input lines 130C and 130D, the input ends 122C and 122D of the merging lines 120C and 120D are positioned close to the output terminals 50A2 and 50B2 of the amplifier units 50A and 50B illustrated in FIG. 1. According to this configuration, the input ends 122C and 122D become separated from the isolation resistor 150Y, and thus, the stubs 140C and 140C are provided between the isolation resistor 150Y and the input ends 122C and 122D, respectively. If such a configuration were not employed and the stubs 140C and 140D were not provided, the lengths of the input lines 130C and 130D would become approximately half-wavelength at the center frequency, and the isolation of the Wilkinson power combiner 100Y may deteriorate to affect the passband characteristics and narrow the passband of the transmission signal.

However, because the provision of the stubs 140C and 140D will deteriorate the isolation characteristic between the input end 122C and the input end 122D, the Wilkinson power combiner 100Y according to the present embodiment uses the resonant circuits 170C and 170D in order to improve the isolation characteristics. Details of resonant circuits 170C and 170D will be described later in the specification.

The input line 130C has an output end connected to the input end 122C of the merging line 120C, and an input terminal 131C. The input terminal 131C is connected to the output terminal 50A2 of the amplifier unit 50A illustrated in FIG. 1. Similarly, the input line 130D has an output end connected to the input end 122D of the merging line 120D, and an input terminal 131D. The input terminal 131D is connected to the output terminal 50B2 of the amplifier unit 50B illustrated in FIG. 1.

The stub 140C connects between input end 122C and the isolation resistor 150Y. The stub 140C may have a constant width and a constant thickness between two ends thereof. In this example, the stub 140C may be described separately for lines 141C and 142C. The lines 141C and 142C are an example of at least a portion of the third stub. The length of the stub 140C may be the same as the lengths of the stubs 140A, 140B, and 140D. For example, the lines 141C and 142C may have the same length, and the same reactance. A point 140C1 between the lines 141C and 142C is a mid point between the two ends of stub 140C, and is an example of a third point. For this reason, the lengths of lines 141C and 142C may be the same as the lengths of the lines 141A and 142A. The third point between two ends of the third stub does not include the two ends of the stub 140C, and refers to a position along a longitudinal direction of the stub 140C other than the two ends of the stub 140C. In the first embodiment, the point 140C1, which is the example of the third point, is the mid point between the two ends of the stub 140C, for example.

The stub 140D connects between the input end 122D and the isolation resistor 150Y. In this example, the stub 140D may be described separately for lines 141D and 142D. The lines 141D and 142D are an example of at least a portion of the fourth stub. For example, the lines 141D and 142D may have the same length, and the lengths of the lines 141D and 142D may be the same as the lengths of the lines 141C and 142C. Thus, the lines 141D and 142D may have the same reactance, and the reactances of the lines 141D and 142D may be the same as the reactances of the lines 141C and 142C. A point 140D1 between the lines 141D and 142D is a mid point between two ends of the stub 140D, and is an example of a fourth point. The fourth point between two ends of the fourth stub does not include the two ends of the stub 140D, and refers to a position along a longitudinal direction of the stub 140D other than the two ends of the stub 140D. In the first embodiment, the point 140D1, which is the example of the fourth point, is the mid point between the two ends of the stub 140D, for example.

The isolation resistor 150Y is provided between the stubs 140C and 140D. The isolation resistor 150Y is provided to ensure isolation between the input ends 122C and 122D. The configuration and resistance value of isolation resistor 150Y may be the same as the configuration and resistance value of the isolation resistor 150X.

The circuit 160Y includes the lines 161C and 161D, capacitors 162C and 162D, and a ground terminal 163Y. In FIG. 3, the lines 161C and 161D are illustrated by blocks, but the line 161C connects between the point 140C1 and the ground terminal 163Y, and the line 161D connects between the point 140D1 and the ground terminal 163Y. For this reason, the capacitors 162C and 162D are actually inserted in series with respect to the lines 161C and 161D, respectively. For example, the lines 161C and 161D may have the same length, and the lengths of the lines 161C and 161D may be the same as the lengths of the lines 161A and 161B. Hence, the lines 161A, 161B, 161C, and 161D may have the same reactance. In addition, the capacitors 162C and 162D may have the same electrostatic capacitance, and the electrostatic capacitances of the capacitors 162C and 162D may be the same as the electrostatic capacitances of the capacitors 162A and 162B. The circuit 160Y may have a configuration which is symmetrical with respect to the ground terminal 163Y between the points 140C1 and 140D1, similar to the circuit 160X.

The resonant circuit 170C is a circuit formed by the lines 141C and 142C of stub 140C, and the line 161C, the capacitor 162C, and the ground terminal 163Y of the circuit 160Y, and forms an LCL filter. In other words, the resonant circuit 170C has a function to attenuate signal components near a desired resonant frequency. A reactance (L) included in the resonant circuit 170C is the reactance of the lines 141C and 142C and the line 161C, and an electrostatic capacitance (C) of the resonant circuit 170C is the electrostatic capacitance of the capacitor 162C.

The resonant circuit 170D is a circuit formed by the lines 141D and 142D of stub 140D, and the line 161D, the capacitor 162D, and the ground terminal 163Y of the circuit 160Y, and forms an LCL filter. In other words, the resonant circuit 170D has a function to attenuate the signal components near the desired resonant frequency. A reactance (L) included in the resonant circuit 170D is the reactance of the lines 141D and 142D and the line 161D, and an electrostatic capacitance (C) of the resonant circuit 170D is the electrostatic capacitance of the capacitor 162D.

In this example of the present embodiment, the resonant frequencies of the resonant circuits 170A, 170B, 170C, and 170D are the same. When the resonant frequencies of the resonant circuits 170A, 170B, 170C, and 170D are denoted by f1, the resonant circuits 170A, 170B, 170C, and 170D have the function to attenuate the signal components near the resonant frequency f1. The frequency band including the resonant frequency f1 is an example of the first frequency band. With regard to the stub 140C which is the example of the third stub, and the stub 140D which is the example of the fourth stub, "at least a portion of the third stub" and "at least a portion of the fourth stub" are to be interpreted as follows, similar to the interpretation associated with the stub 140A which is the example of the first stub, the stub 140B which is the example of the second stub, and the first circuit forming the first resonant circuit (resonant circuits 170A and 170B) of the Wilkinson power divider 100X. In other words, a phrase "at least a portion of the third stub, at least a portion of the fourth stub, and the first circuit form the first resonant circuit" covers a case where the entire stub 140C and the entire stub 140D and the third circuit (circuit 160Y) form the third resonant circuit (resonant circuits 170C and 170D). In the first embodiment, the entire stub 140C and the entire stub 140D are used to form the resonant circuits 170C and 170D.

[Operating Characteristics of Wilkinson Power Divider 100X]

Figure 4:
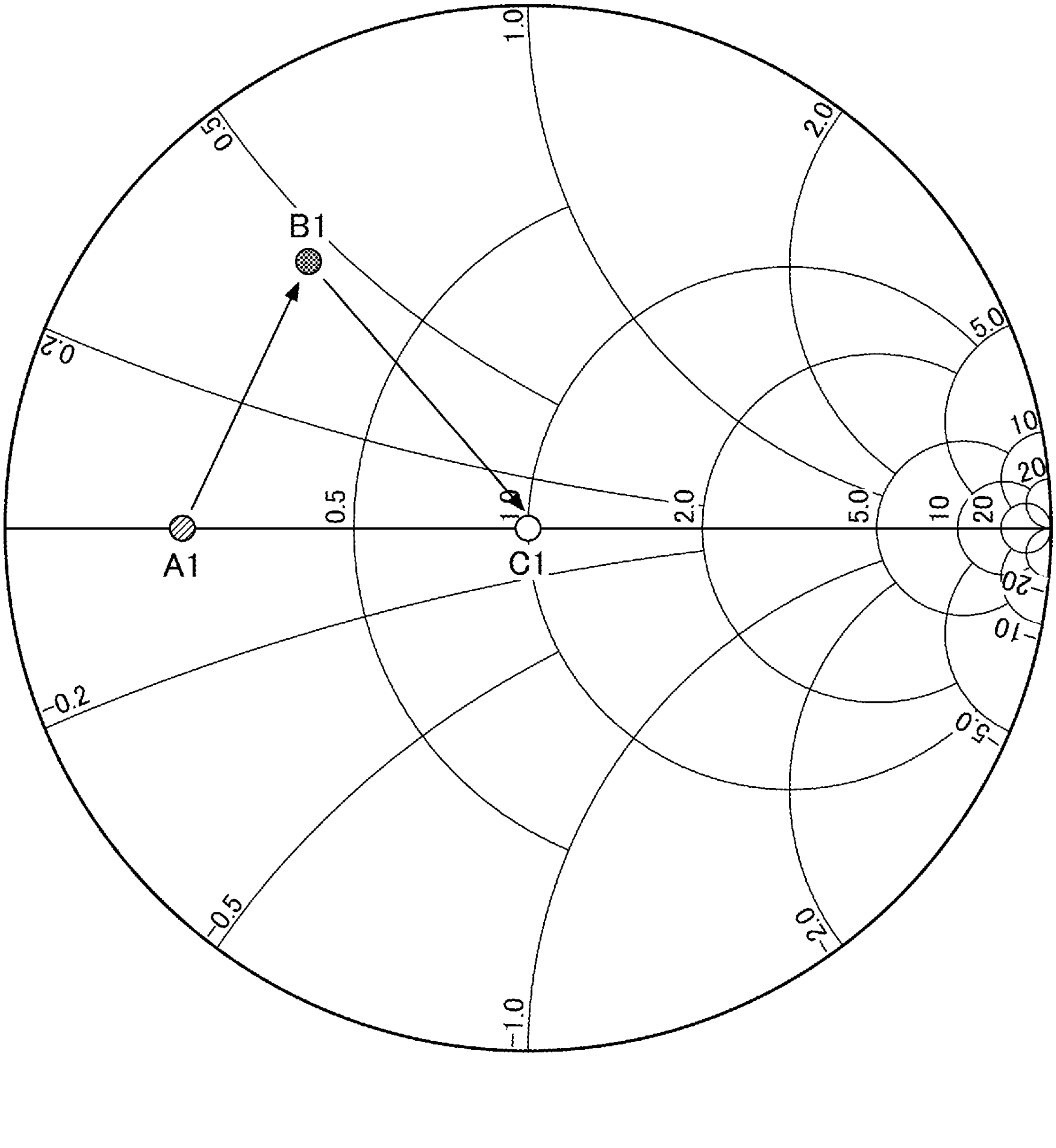
FIG. 4 is a Smith chart illustrating an impedance characteristic of the Wilkinson power divider according to the first embodiment.
Figure 5:
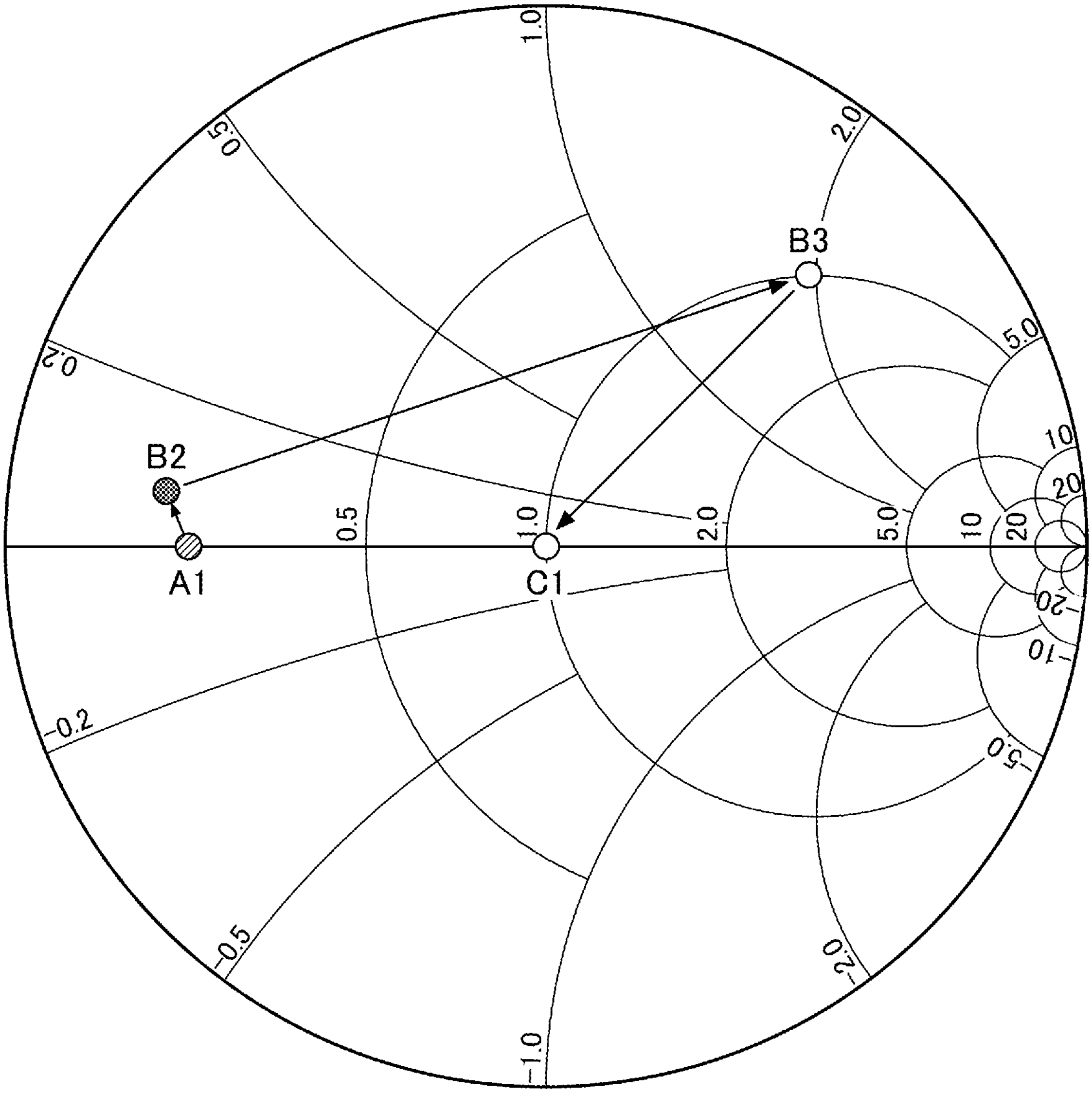
FIG. 5 is a Smith chart illustrating the impedance characteristic of a Wilkinson power divider according to a first comparative example.
Figure 6:
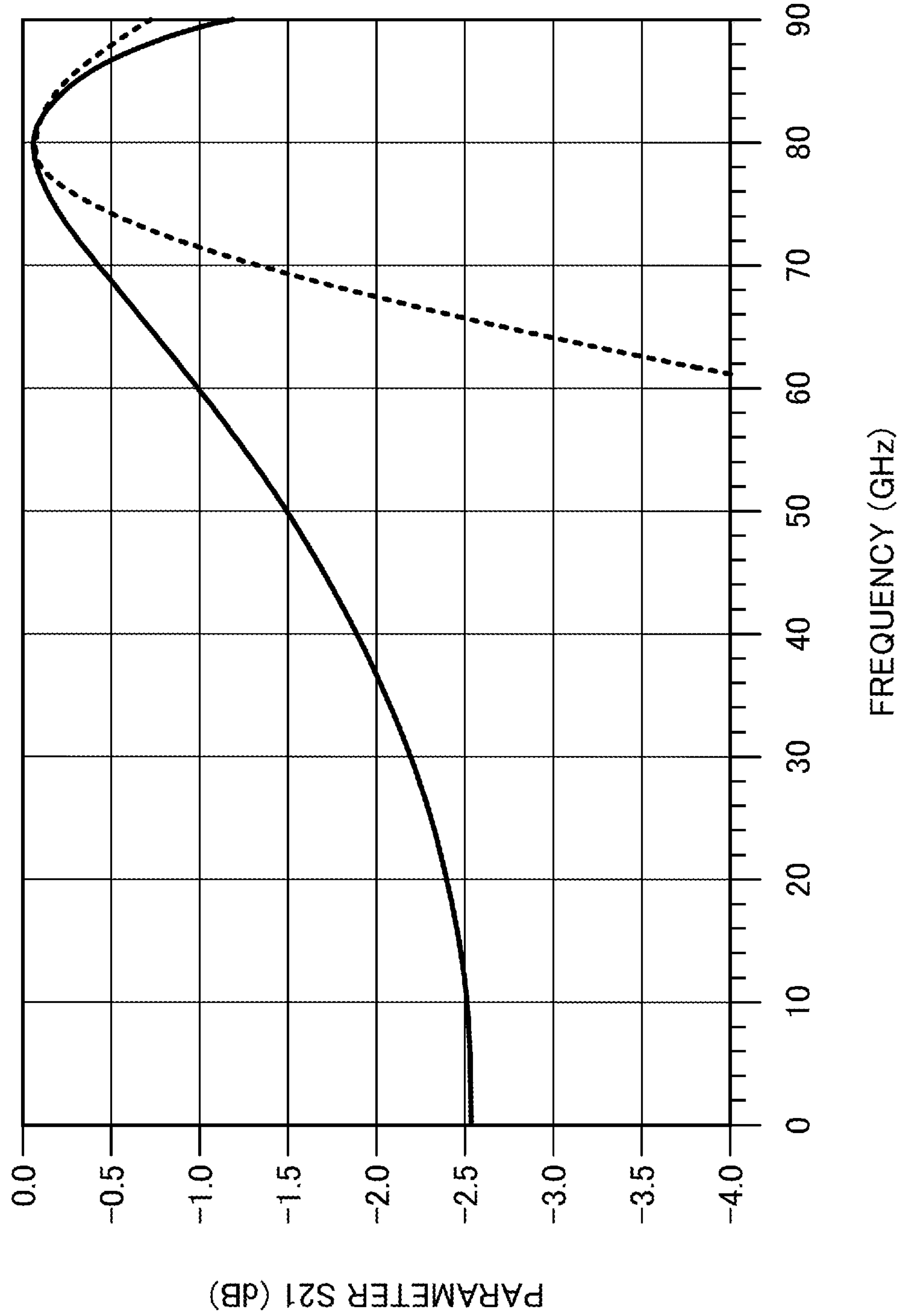
FIG. 6 is a diagram illustrating a frequency characteristic of a parameter S21 of the Wilkinson power divider according to the first embodiment.

FIG. 4 is a Smith chart illustrating an impedance characteristic of the Wilkinson power divider 100X. FIG. 5 is a Smith chart illustrating the impedance characteristic of a Wilkinson power divider according to a first comparative example. FIG. 6 is a diagram illustrating a frequency characteristic of a parameter S21 (transmission coefficient) of the Wilkinson power divider 100X. The Smith charts illustrated in FIG. 4 and FIG. 5, and the parameter S21 illustrated in FIG. 6 were obtained by electromagnetic field simulation. The Wilkinson power divider according to the first comparative example has a configuration corresponding to the Wilkinson power divider described in Japanese Laid-Open Patent Publication No. 2002-217615. More particularly, the Wilkinson power divider according to the first comparative example has a configuration corresponding to the Wilkinson power divider 100X without the circuit 160X, and additionally provided with one short stub added to each of the output ends 122A and 122B, a capacitor inserted in series between the stub 140A and the isolation resistor 150X, and a capacitor inserted in series between the stub 140B and the isolation resistor 150X. The short stub may be a line formed by a microstrip line, and an end of the short stub opposite the end connected to the output end 122A or 122B is grounded. The short stubs and the capacitors that are additionally provided to cancel the reactances of the stubs 140A and 140B.

As illustrated in FIG. 4, in the Wilkinson power divider 100X, it is possible to move from a point A1 which is approximately 0.2 on the real axis, to a point B1 along a constant resistance circle due to the reactances of the stubs 140A and 140B (lines 141A, 142A, 141B, and 142B). Further, it is possible to move from the point B1 to a point C1 which is approximately 1.0 on the real axis, along a constant conductance circle due to the reactances of the lines 161A and 161B and the capacitive impedances of the electrostatic capacitances of the capacitors 162A and 162B. In the Wilkinson power divider 100X, the impedance can thus be adjusted using the resonant circuits 170A and 170B.

Moreover, as illustrated in FIG. 5, in the Wilkinson power divider according to the first comparative example, it is possible to move from the point A1 which is approximately 0.2 on the real axis, to a point B2 due to the reactances of the short stubs (the reactances of the short stubs parallel to the stubs 140A and 140B), and to move from the point B2 to a point B3 due to the reactances of the stubs 140A and 140B (the lines 141A, 142A, 141B, and 142B). Then, it is possible to move from the point B3 to the point C1 due to the capacitors. Accordingly, in the Wilkinson power divider according to the first comparative example, the impedance is greatly separated from the real axis and the impedance cannot be adjusted efficiently, when compared to the movement on the Smith chart of the Wilkinson power divider 100X illustrated in FIG. 4. This is because the provision of the short stubs causes an inefficient movement in the impedance adjustment.

Further, in FIG. 6, the abscissa indicates the frequency (GHz), and the ordinate indicates the value (dB) of the parameter S21 (transmission coefficient). The parameter S21 illustrated in FIG. 6 indicates the passband characteristics from a node (port 2) between the isolation resistor 150X and the stub 140A, to the output end 122A (port 1). The parameter S21 of the Wilkinson power divider 100X is indicated by a solid line, and the parameter S21 of the Wilkinson power divider according to the first comparative example is indicated by a dashed line. As illustrated in FIG. 6, it can be seen that the frequency band of the Wilkinson power divider 100X is broadened compared to the Wilkinson power divider according to the first comparative example.

Figure 7:
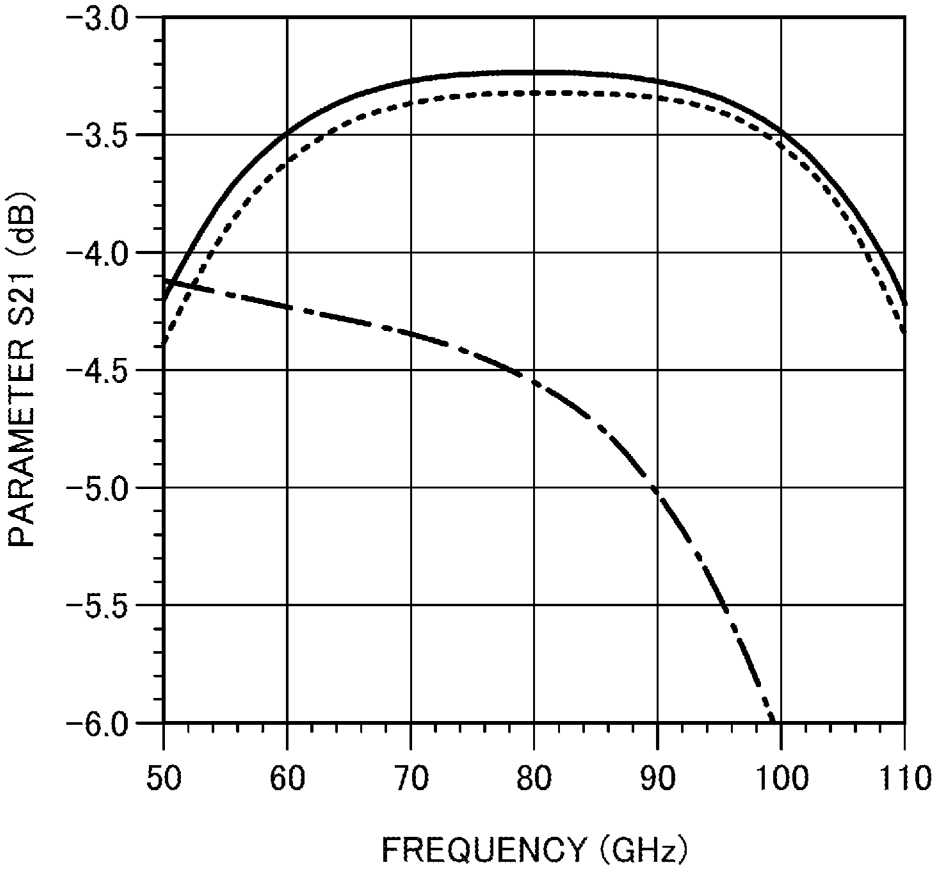
FIG. 7 is a diagram illustrating the frequency characteristic of the parameter S21 of the Wilkinson power divider according to the first embodiment.

FIG. 7 is a diagram illustrating the frequency characteristics of the parameter S21 of the Wilkinson power divider 100X. The parameter S21 illustrated in FIG. 7 was obtained by electromagnetic field simulation. In FIG. 7, the abscissa indicates the frequency (GHz), and the ordinate indicates the value (dB) of the parameter S21 (transmission coefficient). The parameter S21 illustrated in FIG. 7 is the parameter S21 obtained by regarding the input terminal 111X as the port 1, and the output terminal 131A as the port 2. In other words, the parameter S21 illustrated in FIG. 7 indicates the power dividing characteristics (or power splitting characteristics) of the transmission signal from the input terminal 111X to the output terminal 131A.

In FIG. 7, the parameter S21 of the Wilkinson power divider 100X is indicated by a solid line, and the parameter S21 of the Wilkinson power divider according to the first comparative example is indicated by a dashed line. In addition, the parameter S21 of a Wilkinson power divider according to a second comparative example, obtained by regarding the input terminal 111X as the port 1, and the output terminal 131A as the port 2, is indicated by a one-dot chain line. In the Wilkinson power divider according to the second comparative example, the 2 short stubs, the capacitor inserted in series between the stub 140A and the isolation resistor 150X, and the capacitor inserted in series between the stub 140B and the isolation resistor 150X of the Wilkinson power divider according to the first comparative example are omitted.

Compared to the Wilkinson power divider according to the second comparative example having the power dividing characteristics indicated by the one-dot chain line, both the Wilkinson power divider 100X and the Wilkinson power divider according to the first comparative example have improved power dividing characteristics, as indicated by the solid line and the dashed line in FIG. 7. But when a comparison is made at −3.5 dB, for example, it may be seen that the frequency band of the Wilkinson power divider 100X is broadened by approximately 5 GHz compared to the frequency band of the Wilkinson power divider according to the first comparative example. The parameter S21 of the Wilkinson power divider 100X is less than or equal to −3.5 dB in the E-band, the frequency band including the resonant frequency f1, and the frequency band (frequency band higher than 61 GHz and lower than 71 GHz) between the E-band and the frequency band including the resonant frequency f1. This value of −3.5 dB is an example of a predetermined value of the transmission coefficient. As described above, because the parameter S21 is less than or equal to −3.5 dB in the E-band, the frequency band including the resonant frequency f1, and the frequency band between the E-band and the frequency band including the resonant frequency f1, it is possible to obtain a continuous frequency band in which the transmission coefficient is sufficiently large in the frequency band from a lowest frequency of the frequency band including the resonant frequency f1 up to a highest frequency of the E-band, thereby enabling the frequency band of the Wilkinson power divider 100X to be broadened.

The broadening of the frequency band is particularly notable in the frequency band lower than the E-band, and it may be regarded that this broadening of the frequency band is achieved by the frequency band (56 GHz to 61 GHz) including the resonant frequency f1 of the resonant circuits 170A and 170B. In addition, the power dividing characteristics are improved not only in the frequency band lower than the E-band, but also in the frequency band higher than 61 GHz, and the power dividing characteristics are also improved in the frequency band (frequency band higher than 86 GHz) higher than the E-band. Accordingly, it was found that the frequency band of the Wilkinson power divider 100X can be broadened by including the resonant circuits 170A and 170B which resonate in the frequency band from 56 GHz to 61 GHz, for example.

Figure 8:
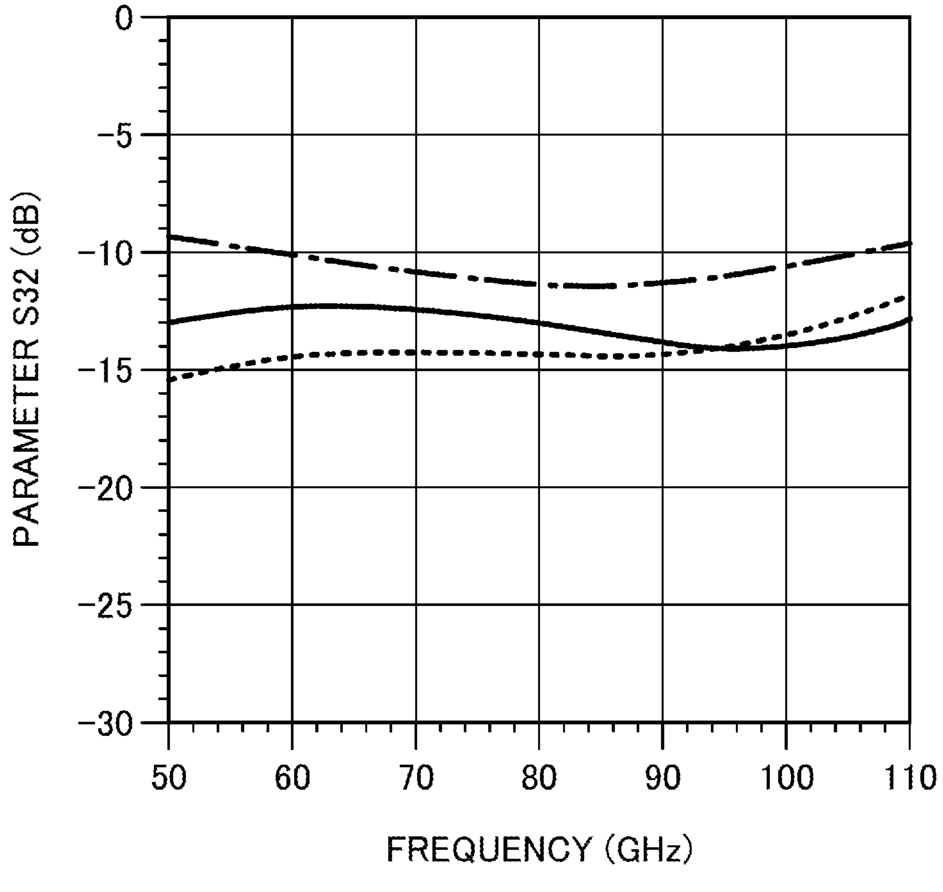
FIG. 8 is a diagram illustrating a frequency characteristic of a parameter S32 of the Wilkinson power divider according to the first embodiment.

FIG. 8 is a diagram illustrating the frequency characteristics of the parameter S32 of the Wilkinson power divider 100X. The parameter S32 illustrated in FIG. 8 was obtained by electromagnetic field simulation. In FIG. 8, the abscissa indicates the frequency (GHz), and the ordinate indicates the value (dB) of the parameter S32 (transmission coefficient). The parameter S32 illustrated in FIG. 8 indicates the transmission coefficient between port 2 and a port 3, by regarding the output terminal 131A as the port 2, and the output terminal 131B as the port 3. In other words, the parameter S32 illustrated in FIG. 8 indicates the isolation characteristics between the port 2 and the port 3. Similar to FIG. 7, the parameter S32 of the Wilkinson power divider 100X is indicated by a solid line, the parameter S32 of the Wilkinson power divider according to the first comparative example is indicated by a dashed line, and the parameter S32 of the Wilkinson power divider according to the second comparative example is indicated by a one-dot chain line.

As illustrated in FIG. 8, the parameter S32 of the Wilkinson power divider 100X indicated by the solid line is 2 dB to 3 dB higher than the parameter S32 of the Wilkinson power divider according to the first comparative example indicated by the dashed line, in the frequency band lower than or equal to approximately 95 GHz, but is 2 dB to 3 dB lower in the frequency band higher than or equal to approximately 95 GHz. Over the entire frequency band from 50 GHz to 110 GHz, the parameter S32 of the Wilkinson power divider 100X indicated by the solid line is lower than a minimum value (approximately −11.5 dB) of the parameter S32 of the Wilkinson power divider according to the second comparative example indicated by the one-dot chain line, and it was confirmed that excellent isolation characteristics are obtained by the Wilkinson power divider 100X.

In the Wilkinson power divider 100X, the isolation characteristics between the output end 122A and the output end 122B are improved by the 2 LCL filters of the resonant circuits 170A and 170B, thereby improving the passband characteristics between the output end 122A and the output end 122B. In addition, the resonant circuits 170A and 170B resonate in the frequency band including the resonant frequency f1. For this reason, the high frequency between the output end 122A and the output end 122B is equivalent to being terminated by 50χ. Moreover, the high frequency between the output end 122A and the output end 122B is equivalent to being terminated by 50χ, due to the resonant circuits 170A and 170B which resonate. According to such principles, the transmission signal in the frequency band including the E-band and the resonant frequency f1, input to the input terminal 111X, is divided (or split) by the branching lines 120A and 120B, and transmission signals of the same phase are output from the output ends 122A and 122B to the output lines 130A and 130B. Hence, it is possible to obtain the broadband Wilkinson power divider 100X which can transmit the transmission signals in the E-band and the frequency band including the resonant frequency f1.

In addition, because the Wilkinson power combiner 100Y performs an operation by reversing the input side and the output side of the Wilkinson power divider 100X, it is possible to obtain the broadband Wilkinson power combiner 100Y, similar to the broadband Wilkinson power divider 100X. More particularly, the 2 transmission signals of the same phase input to the input lines 130C and 131D via the input terminals 131C and 131D, respectively, are transmitted through the merging lines 120C and 120D and combined by reaching the output ends 121C and 121D with the same phase, and output from the output terminal 111Y via the output line 110Y. Such an operation is similarly performed for the transmission signal in the E-band, and the transmission signal in the frequency band including the resonant frequency f1.

Accordingly, it is possible to provide the broadband Wilkinson power divider 100X, the broadband Wilkinson power combiner 100Y, and the broadband power amplifier 10.

Further, in the Wilkinson power divider 100X, by utilizing the lines 141A and 142A of the stub 140A, and the lines 141B and 142B of the stub 140B, as portions of the reactances of the resonant circuits 170A and 170B, it is possible to shorten the lines 161A and 161B of the circuit 160X, and minimize the reactances of lines 161A and 161B. Moreover, it is possible to reduce the circuit scale of the circuit 160X.

In addition, in the Wilkinson power divider 100X, because the resonant circuits 170A and 170B are LCL filters, it is possible to reduce the generation of harmonics, and effectively improve the isolation between the output end 122A and the output end 122B.

Further, in the Wilkinson power divider 100X, because the points 140A1 and 140B1 on the stubs 140A and 140B are mid points, the entirety of the stubs 140A and 140B can be utilized in the resonant circuits 170A and 170B resonating in the frequency band including the resonant frequency f1, and the Wilkinson power divider 100X having a simple configuration can be obtained.

Moreover, in the Wilkinson power combiner 100Y, by utilizing the lines 141C and 142C of the stub 140C, and the lines 141D and 142D of the stub 140D, as portions of the reactances of the resonant circuits 170C and 170D, it is possible to shorten the lines 161C and 161D of the circuit 160Y, and minimize the reactances of the lines 161C and 161D. In addition, it is possible to reduce the circuit scale of the circuit 160Y. Further, because the resonant circuits 170C and 170D are LCL filters, it is possible to reduce the generation of harmonics, and effectively improve the isolation between the input end 122C and the input end 122D.

In addition, in the Wilkinson power combiner 100Y, because the points 140C1 and 140D1 on the stubs 140C and 140D are mid points, the entirety of the stubs 140C and 140D can be utilized in the resonant circuits 170C and 170D resonating in the frequency band including the resonant frequency f1, and the Wilkinson power combiner 100Y having a simple configuration can be obtained.

[Configuration of Wilkinson Power Divider 100XM]

Figure 9:
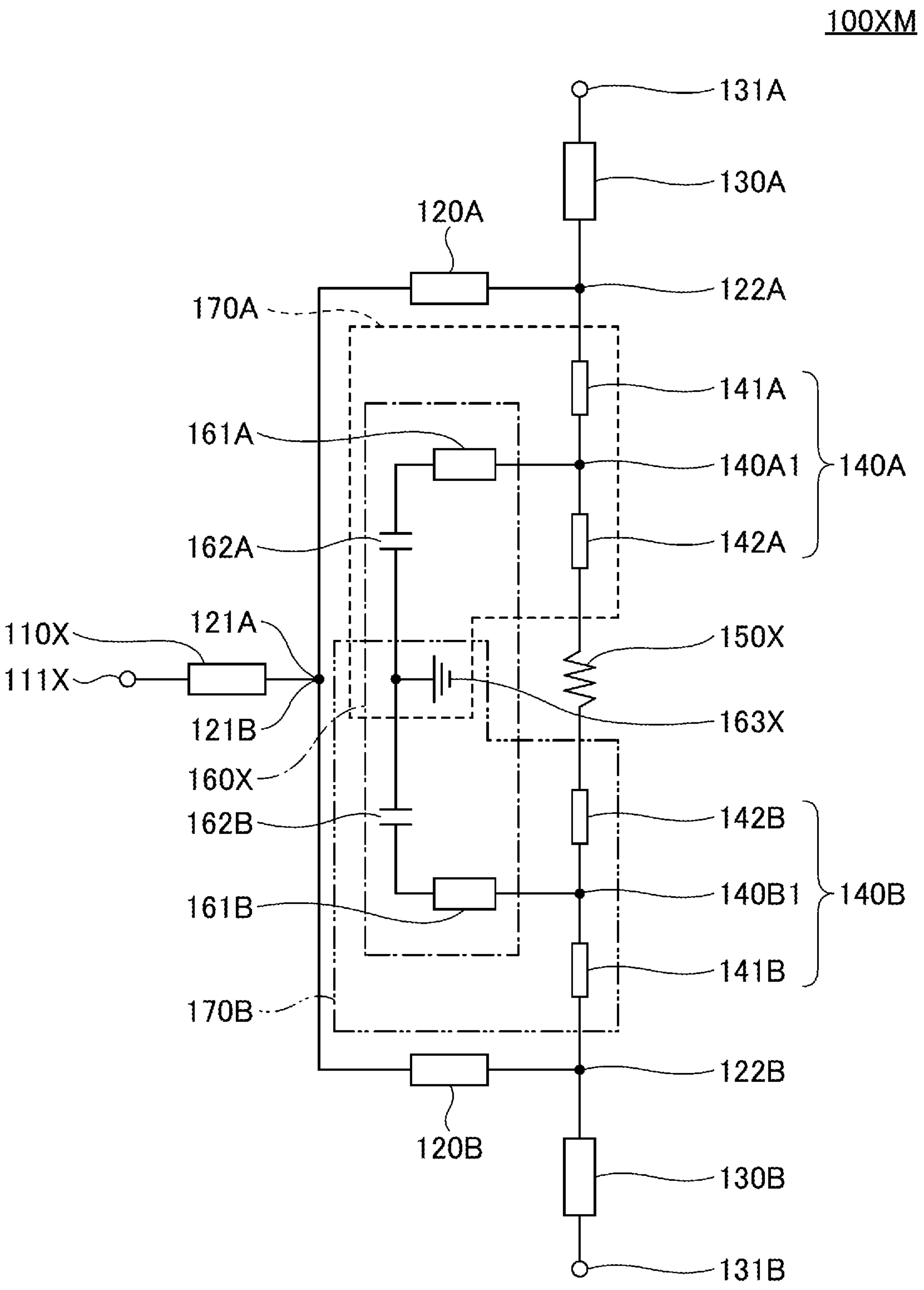
FIG. 9 is a diagram illustrating an example of the configuration of the Wilkinson power divider according to a modification of the first embodiment.

FIG. 9 is a diagram illustrating an example of the configuration of a Wilkinson power divider 100XM according to a modification of the first embodiment. The Wilkinson power divider 100XM differs from the Wilkinson power divider divider 100X illustrated in FIG. 2, in that the circuit 160X is disposed in a region surrounded by the branching lines 120A and 120B, the stubs 140A and 140B, and the isolation resistor 150X. In other words, the circuit 160X is disposed on the same side as the branching lines 120A and 120B, with respect to the stubs 140A and 140B, and the isolation resistor 150X. The configuration of other portions of the Wilkinson power divider 100XM are similar to those of the Wilkinson power divider 100X illustrated in FIG. 2.

The frequency band of the Wilkinson power divider 100XM having the configuration described above can be broadened, and the size of the Wilkinson power divider 100XM can be reduced, similar to the Wilkinson power divider 100X illustrated in FIG. 2. In addition, the frequency band of a Wilkinson power combiner can be broadened, and the size of the Wilkinson power combiner 100Y can be reduced, similar to the Wilkinson power divider 100XM, by disposing the circuit 160Y on the same side as the merging lines 120C and 120D, with respect to the stubs 140C and 140D, and the isolation resistor 150Y. Because the amplifier units 50A and 50B of the power amplifier 10 illustrated in FIG. 1 include a large number of amplifiers 51A and 51B, respectively, spaces around the Wilkinson power divider 100X and the Wilkinson power combiner 100Y may be limited. In such a case, the Wilkinson power divider 100XM, and the Wilkinson power combiner having the size thereof reduced similarly to the Wilkinson power divider 100XM, have advantages in that these Wilkinson power divider 100XM and Wilkinson power combiner can be disposed in limited spaces with ease. In particular, because the output side of the amplifier units 50A and 50B where the Wilkinson power combiner is disposed includes a larger number of amplifiers 51A and 51B connected in parallel than the input side of the amplifier units 50A and 50B, the space for providing the Wilkinson power combiner is very likely limited. Hence, the Wilkinson power combiner having the reduced size is very useful in the case where the space for providing the Wilkinson power combiner is limited.

Second Embodiment

Figure 10:
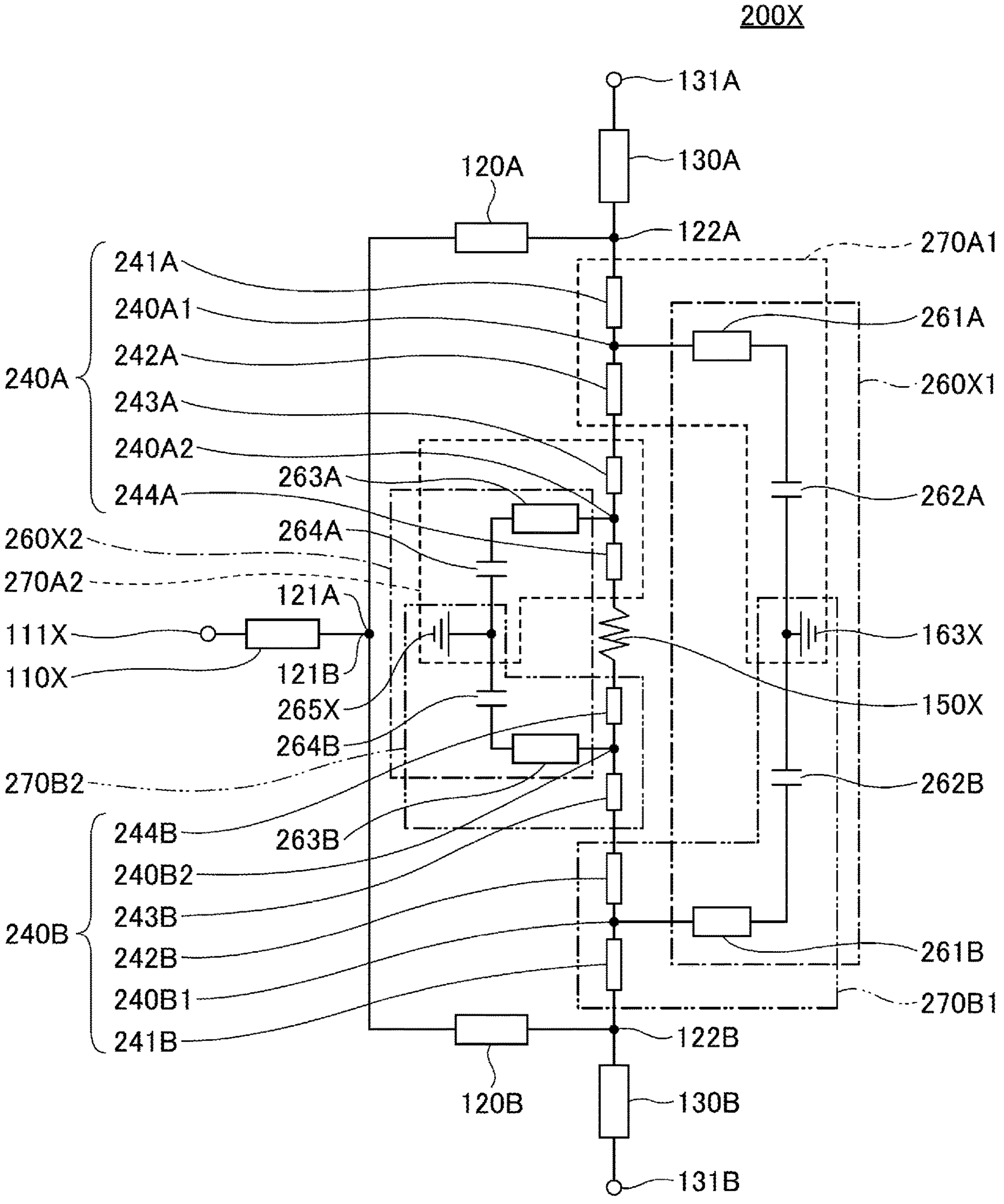
FIG. 10 is a diagram illustrating an example of a configuration of the Wilkinson power divider according to a second embodiment.
Figure 11:
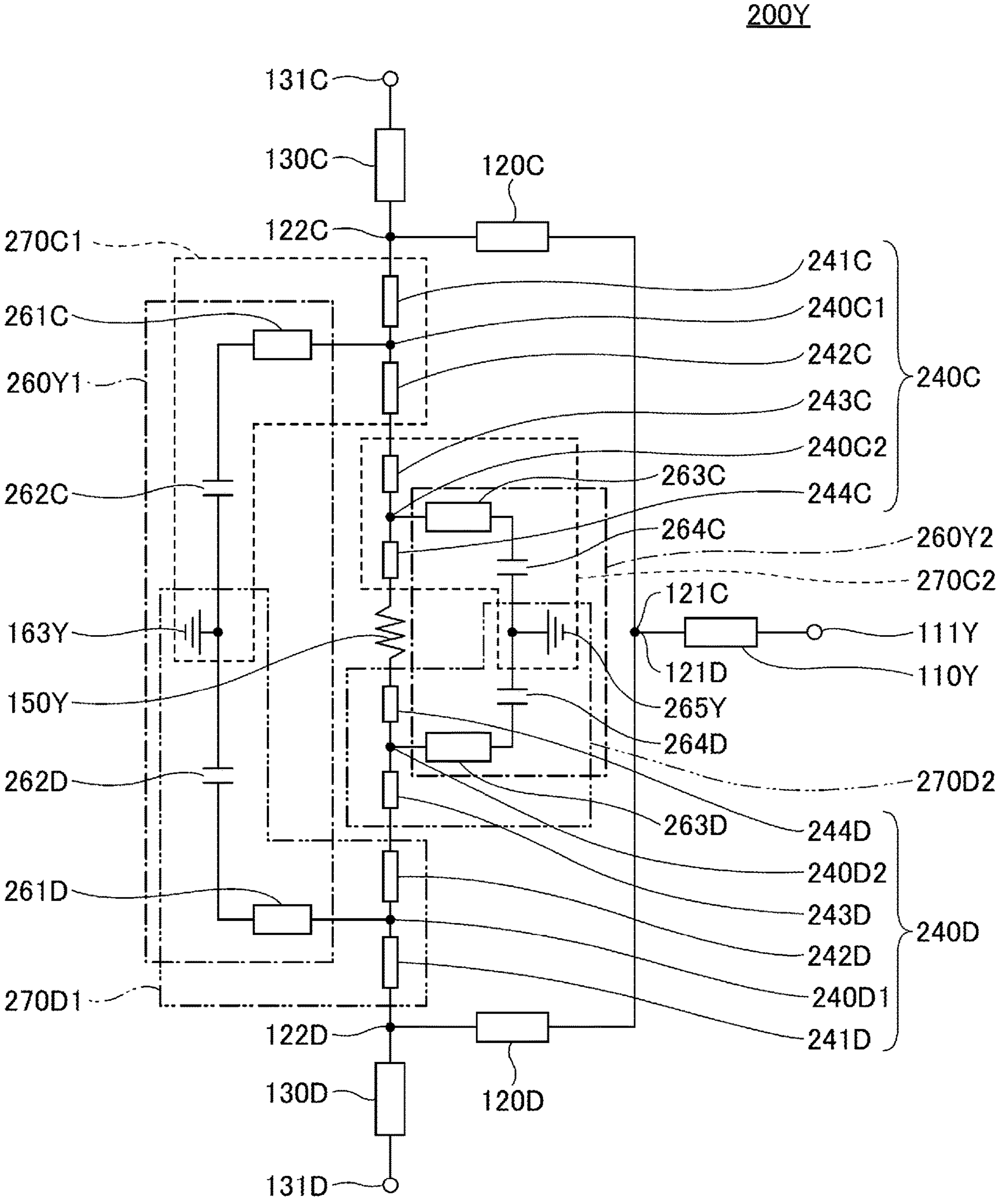
FIG. 11 is a diagram illustrating an example of a configuration of a Wilkinson power combiner according to the second embodiment.

A second embodiment relates to a Wilkinson power divider 200X illustrated in FIG. 10, and a Wilkinson power combiner 200Y illustrated in FIG. 11, which can be used in place of the Wilkinson power divider 100X and the Wilkinson power combiner 100Y of the power amplifier 10 illustrated in FIG. 1, respectively.

[Configuration of Wilkinson Power Divider 200X]

FIG. 10 illustrates an example of the configuration of the Wilkinson power divider 200X. The Wilkinson power divider 200X has a configuration including a circuit 260X2 in addition to the configuration of the Wilkinson power divider 100X according to the first embodiment. In addition, the Wilkinson power divider 200X includes stubs 240A and 240B, and a circuit 260X1 in place of the stubs 140A and 140B, and the circuit 160X of the Wilkinson power divider 100X illustrated in FIG. 2. Hereinafter, the difference between the Wilkinson power divider 200X and the Wilkinson power divider 100X according to the first embodiment will mainly be described.

The Wilkinson power divider 200X includes the input line 110X, the branching lines 120A and 120B, the output lines 130A and 130B, the stubs 240A and 240B, the isolation resistor 150X, and the circuits 260X1 and 260X2. In addition, the Wilkinson power divider 200X includes resonant circuits 270A1, 270B1, 270A2, and 270B2. The stub 240A is an example of the first stub, and the stub 240B is an example of the second stub. The circuit 260X1 is an example of the first circuit, and the circuit 260X2 is an example of the second circuit. A circuit including a combination of the resonant circuits 270A1 and 270B1 is an example of the first resonant circuit, and a circuit including a combination of the resonant circuits 270A2 and 270B2 is an example of the second resonant circuit.

The stub 240A connects between the output end 122A and the isolation resistor 150X. The stub 240A may have a constant width and a constant thickness between two ends thereof. In this example, the stub 240A may be described separately for lines 241A, 242A, 243A, and 244A. For example, the lines 241A and 242A may have the same length and the same reactance, and the lines 243A and 244A may have the same length and the same reactance. The length and the reactance of the lines 241A and 242A are longer and greater than the length and the reactance of the lines 243A and 244A, respectively.

A point 240A1 between the lines 241A and 242A is an example of the first point, and a point 240A2 between the lines 243A and 244A is an example of the third point. The points 240A1 and 240A2 are provided in this order in a path from the output end 122A to a connection terminal where the stub 240A connects to the isolation resistor 150X. A connection terminal where the stub 240A connects to the output end 122A is an example of a first connection terminal, and the connection terminal where the stub 240A connects to the isolation resistor 150X is an example of a third connection terminal. The length of the stub 240A may be in a range of approximately ⅛ to approximately ¼ of the electrical length λe of the wavelength at the center frequency, for example.

The lines 241A and 242A are included in the resonant circuit 270A1, and the lines 243A and 244A are included in the resonant circuit 270A2. The lines 241A and 242A are an example of at least a first portion of stub 240A. The lines 243A and 244A are an example of at least a second portion, other than the first portion, of the stub 240A. A length of the line 241A is an example of a first length corresponding to the resonant frequency of the resonant circuit 270A1. A length of the line 244A is an example of a second length corresponding to the resonant frequency of the resonant circuit 270A2. A total length of the lines 242A and 243A is an example of a total length of the first length and the second length.

The stub 240B connects between the output end 122B and the isolation resistor 150X. The stub 240B may have a constant width and a constant thickness between two ends thereof. In this example, the stub 240B may be described separately for lines 241B, 242B, 243B, and 244B. For example, the length of the stub 240B may be the same as the length of the stub 240A. In addition, the lines 241B and 242B may have the same length which is the same as the length of the lines 241A and 242A, for example. For this reason, the lines 241B and 242B may have the same reactance which is the same as the reactance of the lines 241A and 242A, for example. The length and the reactance of the lines 241B and 242B are longer and greater than the length and the reactance of the lines 243B and 244B, respectively.

A point 240B1 between the lines 241B and 242B is an example of the second point, and a point 240B2 between the lines 243B and 244B is an example of the fourth point. The points 240B1 and 240B2 are provided in this order in a path from the output end 122B to a connection terminal where the stub 240B connects to the isolation resistor 150X. A connection terminal where the stub 240B connects to the output end 122B is an example of a second connection terminal, and the connection terminal where the stub 240B connects to the isolation resistor 150X is an example of a fourth connection terminal. The length of the stub 240B may be the same as the length of the stub 240A.

The lines 241B and 242B are included in the resonant circuit 270B1, and the lines 243B and 244B are included in the resonant circuit 270B2. The lines 241B and 242B are an example of at least a first portion of the stub 240B. The lines 243B and 244B are an example of at least a second portion, other than the first portion, of the stub 240B. The resonant frequency of the resonant circuit 270B1 is the same as the resonant frequency of the resonant circuit 270A1, and the resonant frequency of the resonant circuit 270B2 is the same as the resonant frequency of the resonant circuit 270A2. A length of the line 241B is an example of the first length corresponding to the resonant frequency of the resonant circuits 270A1 and 270B1. A length of the line 244B is an example of the second length corresponding to the resonant frequency of the resonant circuits 270A2 and 270B2. A total length of the lines 242B and 243B is an example of the total length of the first length and the second length. The isolation resistor 150X is provided between the stubs 240A and 240B.

The circuit 260X1 includes lines 261A and 261B, capacitors 262A and 262B, and the ground terminal 163X. The circuit 260X1 is disposed on the opposite side from the branching lines 120A and 120B, with respect to the stubs 240A and 240B, and the isolation resistor 150X. In FIG. 10, the lines 261A and 261B are illustrated by blocks, but the line 261A connects between the point 240A1 and the ground terminal 163X, and the line 261B connects between the point 240B1 and the ground terminal 163X. For this reason, the capacitors 262A and 262B are actually inserted in series with respect to the lines 261A and 261B, respectively. For example, the lines 261A and 261B may have the same length, and the same reactance. A single line, which is a combination of the lines 261A and 261B, is an example of the first line. Further, the capacitors 162A and 162B, which form an example of a first capacitor, may have the same electrostatic capacitance. The circuit 160X may have a configuration which is symmetrical with respect to the ground terminal 163X between the points 240A1 and 240B1. The reactance of the lines 261A and 261B and the electrostatic capacitance of the capacitors 262A and 262B are different from the reactance of the lines 161A and 161B and the electrostatic capacitance of the capacitors 162A and 162B illustrated in FIG. 2.

The circuit 260X2 includes lines 263A and 263B, capacitors 264A and 264B, and a ground terminal 265X. The circuit 260X2 is provided on the same side as the branching lines 120A and 120B, with respect to the stubs 240A and 240B, and the isolation resistor 150X. Thus, by disposing the circuit 260X2 in a region surrounded by the stubs 240A and 240B, the isolation resistor 150X, and the branching lines 120A and 120B, it is possible to effectively utilize the area on the substrate or the like on which the Wilkinson power divider 200X is formed, and reduce the size of the Wilkinson power divider 200X.

In FIG. 10, the lines 263A and 263B are illustrated by blocks, but the line 263A connects between the point 240A2 and the ground terminal 265X, and the line 263B connects between the point 240B2 and the ground terminal 265X. For this reason, the capacitors 263A and 263B are actually inserted in series with respect to the lines 263A and 263B, respectively. For example, the lines 263A and 263B may have the same length, and the same reactance. The lines 263A and 263B are an example of the second line. Further, the capacitors 264A and 264B, which form an example of a second capacitor, may have the same electrostatic capacitance. The circuit 260X2 may have a configuration which is symmetrical with respect to the ground terminal 265X between the points 240A2 and 240B2. The length of the lines 263A and 263B is shorter than the length of the lines 261A and 261B, and the electrostatic capacitance of the capacitors 264A and 264B is different from the electrostatic capacitance of the capacitors 262A and 262B.

The circuit 260X2 is connected to the points 240A2 and 240B2 which are closer to the isolation resistor 150X than the points 240A1 and 240B1 of the stubs 240A and 240B, for the following reasons. Because the circuit 260X2 is provided on the same side as the branching lines 120A and 120B, with respect to the stubs 240A and 240B, and the isolation resistor 150X, the circuit 260X2 is separated from the branching lines 120A and 120B as much as possible, so as to prevent or reduce coupling between the circuit 260X2 and the branching lines 120A and 120B. In addition, the length of the lines 241A, 242A, 241B, and 242B of the stubs 240A, 240B is made longer than the length of the lines 243A, 244A, 243B, and 244B, in order to separate the circuit 260X2 from the branching lines 120A and 120B as much as possible, and prevent or reduce the coupling between the circuit 260X2 and the branching lines 120A and 120B. According to such a configuration, the circuit 260X2 can be separated from the branching lines 120A and 120B.

The resonant circuit 270A1 is a circuit formed by the lines 241A and 242A of the stub 240A, and the line 261A, the capacitor 262A, and the ground terminal 163X of circuit 260X1, and forms an LCL filter. In other words, the resonant circuit 270A1 has a function to attenuate the signal components near the desired resonant frequency. A reactance (L) included in the resonant circuit 270A1 is the reactance of the lines 241A and 242A and the line 261A, and an electrostatic capacitance (C) of the resonant circuit 270A1 is the electrostatic capacitance of the capacitor 262A.

The resonant circuit 270B1 is a circuit formed by the lines 241B and 242B of the stub 240B, and the line 261B, the capacitor 262B, and the ground terminal 163X of circuit 260X1, and forms an LCL filter. In other words, the resonant circuit 270B1 has a function to attenuate the signal components near the desired resonant frequency. The reactance (L) included in the resonant circuit 270B1 is the reactance of the lines 241B and 242B and the line 261B, and the electrostatic capacitance (C) of the resonant circuit 270B1 is the electrostatic capacitance of the capacitor 262B.

In this example of the present embodiment, the resonant frequencies of the resonant circuits 270A1 and 270B1 are the same, because the reactances of the lines 241A, 242A, 241B, and 242B are all the same, the reactances of the lines 261A and 261B are the same, and the electrostatic capacitances of the capacitors 262A and 262B are the same. When the resonant frequency of the resonant circuits 270A1 and 270B1 is denoted by f1, the resonant circuits 270A1 and 270B1 have the function to attenuate the signal components near the resonant frequency f1. The resonant frequency f1 is an example of the first resonant frequency. The frequency band including the resonant frequency f1 is an example of the first frequency band, and is a frequency band (lower than 71 GHz) lower than or a frequency band (higher than 86 GHz) higher than the E-band which is the frequency band including the center frequency. The resonant frequency f1 is different from the center frequency. As an example, it is assumed that the frequency band including the resonant frequency f1 is a frequency band in a range from 56 GHz to 61 GHz. Hence, the frequency band including the resonant frequency f1 is different from the E-band, which is the frequency band including the center frequency.

The resonant circuit 270A2 is a circuit formed by the lines 243A and 244A of stub 240A, and the line 263A, the capacitor 264A, and the ground terminal 265X of the circuit 260X2, and forms an LCL filter. In other words, the resonant circuit 270A2 has a function to attenuate the signal components near the desired resonant frequency. The reactance (L) included in the resonant circuit 270A2 is the reactance of the lines 243A and 244A and the line 263A, and the electrostatic capacitance (C) of the resonant circuit 270A2 is the electrostatic capacitance of the capacitor 264A.

The resonant circuit 270B2 is a circuit formed by the lines 243B and 244B of the stub 240B, and the line 263B, the capacitor 264B, and the ground terminal 265X of the circuit 260X2, and forms an LCL filter. In other words, the resonant circuit 270B2 has a function to attenuate the signal components near the desired resonant frequency. The reactance (L) included in resonant circuit 270B2 is the reactance of the lines 243B and 244B and the line 263B, and the electrostatic capacitance (C) of the resonant circuit 270B2 is the electrostatic capacitance of the capacitor 264B.

In this example of the present embodiment, the resonant frequencies of the resonant circuits 270A2 and 270B2 are the same, because the reactances of the lines 243A, 244A, 243B, and 244B are all the same, the reactances of the lines 263A and 263B are the same, and the electrostatic capacitances of the capacitors 264A and 264B are the same. When the resonant frequency of the resonant circuits 270A2 and 270B2 is denoted by f2, the resonant circuits 270A2 and 270B2 have the function to attenuate signal components near the resonant frequency f2. The resonant frequency f2 is an example of the second resonant frequency. The frequency band including the resonant frequency f2 is an example of the second frequency band, and is a frequency band (lower than 71 GHz) lower than or a frequency band (higher than 86 GHz) higher than the E-band which is the frequency band including the center frequency. For example, the resonant frequency f2 is 98 GHz, and the frequency band including the resonant frequency f2 is a frequency band in a range from 96 GHz to 101 GHz. Hence, the frequency band including the resonant frequency f2 is different from the E-band, which is the frequency band including the center frequency. Further, the frequency band including the resonant frequency f2 is higher than the frequency band including the resonant frequency f1, for example.

The frequency band including the resonant frequency f2 is set higher than the frequency band including the resonant frequency f1, for the following reasons. The length of the lines 241A, 242A, 241B, and 242B are set longer than the length of the lines 243A, 244A, 243B, and 244B, so as to separate the circuit 260X2 from the branching lines 120A and 120B as much as possible. The reactance of the lines 243A, 244A, 243B, and 244B are smaller than the reactance of the lines 241A, 242A, 241B, and 242B, 242B, because the width and thickness of the lines 241A, 242A, 241B, and 242B and the lines 243A, 244A, 243B, and 244B are constant, and it is easier to design the frequency band including the resonant frequency f2 to be higher than the frequency band including the resonant frequency f1.

[Configuration of Wilkinson Power Combiner 200Y]

FIG. 11 is a diagram illustrating an example of the configuration of the Wilkinson power combiner 200Y. The Wilkinson power combiner 200Y has a configuration including a circuit 260Y2 in addition to the configuration of the Wilkinson power combiner 100Y according to the first embodiment. In addition, the Wilkinson power combiner 200Y includes stubs 240C and 240D, and a circuit 260Y1 in place of the stubs 140C and 140D, and the circuit 160Y illustrated in FIG. 3. Hereinafter, the difference between the Wilkinson power combiner 200Y and the Wilkinson power combiner 100Y according to the first embodiment will mainly be described.

The Wilkinson power combiner 200Y includes the output line 110Y, the merging lines 120C and 120D, the input lines 130C and 130D, the stubs 240C and 240D, the isolation resistor 150Y, and circuits 260Y1 and 260Y2. In addition, the Wilkinson power combiner 200Y includes resonant circuits 270C1, 270D1, 270C2, and 270D2. The stub 240C is an example of the third stub, and the stub 240D is an example of the fourth stub. The circuit 260Y1 is an example of the third circuit, and the circuit 260Y2 is an example of the fourth circuit. A circuit including a combination of the resonant circuits 270C1 and 270D1 is an example of the third resonant circuit, and a circuit including a combination of the resonant circuits 270C2 and 270D2 is an example of the fourth resonant circuit.

The stub 240C connects between the input end 122C and the isolation resistor 150Y. The stub 240C may have a constant width and a constant thickness between two ends thereof. In this example, the stub 240C may be described separately for lines 241C, 242C, 243C, and 244C. For example, the lines 241C and 242C may have the same length and the same reactance, and the lines 243C and 244C may have the same length and the same reactance. For example, the length and the reactance of the lines 241C and 242C are longer and greater than the length and the reactance of the lines 243C and 244C, respectively.

A point 240C1 between the lines 241C and 242C is an example of a fifth point, and a point 240C2 between the lines 243C and 244C is an example of a seventh point. The points 240C1 and 240C2 are provided in this order in a path from the input end 122C to a connection terminal where the stub 240C connects to the isolation resistor 150Y. A connection terminal where the stub 240C connects to the input end 122C is an example of a fifth connection terminal, and the connection terminal where the stub 240C connects to the isolation resistor 150Y is an example of a seventh connection terminal. The length of the stub 240C may be in a range of approximately ⅛ to approximately ¼ of the electrical length $\lambda e$ of the wavelength at the center frequency, for example. The fifth point between two ends of the third stub does not include the two ends of the stub 240C, and refers to a position along a longitudinal direction of the stub 240C other than the two ends of the stub 240C. The same holds true for the seventh point.

The lines 241C and 242C are included in the resonant circuit 270C1, and the lines 243C and 244C are included in the resonant circuit 270C2. The lines 241C and 242C are an example of at least a first portion of the stub 240C. The lines 243C and 244C are an example of at least a second portion, other than the first portion, of the stub 240C. A length of line 241C is an example of the first length corresponding to the resonant frequency of the resonant circuit 270C1. A length of line 244C is an example of the second length corresponding to the resonant frequency of the resonant circuit 270C2. A total length of the lines 242C and 243C is an example of the total length of the first length and the second length.

The stub 240D connects between the input end 122D and the isolation resistor 150Y. The stub 240D may have a constant width and a constant thickness between two ends thereof. In this example, the stub 240D may be described separately for lines 241D, 242D, 243D, and 244D. For example, the length of the stub 240D may be the same as the length of the stub 240C. In addition, for example, the lines 241D and 242D may have the same length, and the length of the lines 241D and 242D may be the same as the length of the lines 241C and 242C. For this reason, the lines 241D and 242D may have the same reactance, and the reactance of the lines 241D and 242D may be the same as the reactance of the lines 241C and 242C. Moreover, for example, the lines 243D and 244D may have the same length, and the length of the lines 243D and 244D may be the same as the length of the lines 243C and 244C. Hence, the lines 243D and 244D may have the same reactance, and the reactance of the lines 243D and 244D may be the same as the reactance of the lines 243C and 244C. The length and the reactance of the lines 241D and 242D are longer and greater than the length and the reactance of the lines 243D and 244D, respectively.

A point 240D1 between the lines 241D and 242D is an example of a sixth point, and a point 240D2 between the lines 243D and 244D is an example of an eighth point. The points 240D1 and 240D2 are provided in this order in a path from the input end 122D to a connection terminal where the stub 240D connects to the isolation resistor 150Y. A connection terminal where the stub 240D connects to the input end 122D is an example of a sixth connection terminal, and the connection terminal where the stub 240D connects to the isolation resistor 150Y is an example of an eighth connection terminal. The length of stub 240D is the same as the length of the stub 240C. The sixth point between two ends of the fourth stub does not include the two ends of the stub 240D, and refers to a position along a longitudinal direction of the stub 240D other than the two ends of the stub 240D. The same holds true for the eighth point.

The lines 241D and 242D are included in the resonant circuit 270D1, and the lines 243D and 244D are included in the resonant circuit 270D2. The lines 241D and 242D are an example of at least a first portion of the stub 240D. The lines 243D and 244D are an example of at least a second portion, other than the first portion, of the stub 240D. The resonant frequency of the resonant circuit 270D1 may be the same as the resonant frequency of the resonant circuit 270C1, and the resonant frequency of the resonant circuit 270D2 may be the same as the resonant frequency of the resonant circuit 270C2. A length of the line 241D is an example of the first length corresponding to the resonant frequency of resonant circuits 270C1 and 270D1. A length of the line 244D is an example of the second length corresponding to the resonant frequency of the resonant circuits 270C2 and 270D2. A total length of the lines 242D and 243D is an example of the total length of the first length and the second length. The isolation resistor 150Y is provided between the stubs 240C and 240D.

The circuit 260Y1 includes lines 261C and 261D, capacitors 262C and 262D, and the ground terminal 163Y. The circuit 260Y1 is disposed on the opposite side from the merging lines 120C and 120C, with respect to the stubs 240C and 240D, and the isolation resistor 150Y. In FIG. 11, the lines 261C and 261D are illustrated by blocks, but the line 261C connects between the point 240C1 and the ground terminal 163Y, and the line 261D connects between the point 240D1 and the ground terminal 163Y. For this reason, the capacitors 262C and 262D are actually inserted in series with respect to the lines 261C and 261D, respectively. For example, the lines 261C and 261D may have the same length, and the same reactance. The lines 261C and 261D are an example of the third line. Further, the capacitors 262C and 262D, which form an example of a third capacitor, may have the same electrostatic capacitance. The circuit 260Y1 may have a configuration which is symmetrical with respect to the ground terminal 163Y between the points 240C1 and 240D1. The reactance of the lines 261C and 261D and the electrostatic capacitance of the capacitors 262C and 262D are different from the reactance of the lines 161C and 161D and the electrostatic capacitance of the capacitors 162C and 162D illustrated in FIG. 3.

The circuit 260Y2 includes lines 263C and 263D, capacitors 264C and 264D, and a ground terminal 265Y. The circuit 260Y2 is provided on the same side as the merging lines 120C and 120D, with respect to the stubs 240C and 240D and the isolation resistor 150Y. Thus, by disposing the circuit 260Y2 in a region surrounded by the stubs 240C and 240D, the isolation resistor 150Y, and the merging lines 120C and 120D, it is possible to effectively utilize the area on the substrate or the like on which the Wilkinson power combiner 200Y is formed, and reduce the size of the Wilkinson power combiner 200Y.

In FIG. 11, the lines 263C and 263D are illustrated by blocks, but the line 263C connects between the point 240C2 and the ground terminal 265Y, and the line 263D connects between the point 240D2 and the ground terminal 265Y. For this reason, the capacitors 264C and 264D are actually inserted in series with respect to the lines 263C and 263D, respectively. For example, the lines 263C and 263D may have the same length, and the same reactance. The lines 263C and 263D are an example of a fourth line. In addition, the capacitors 264C and 264D, which form an example of a fourth capacitor, may have the same electrostatic capacitance. The circuit 260Y2 may have a configuration which is symmetrical with respect to the ground terminal 265Y between the points 240C2 and 240D2. The length of the lines 263C and 263D is shorter than the length of the lines 261C and 261D, and the electrostatic capacitance of the capacitors 264C and 264D is different from the electrostatic capacitance of the capacitors 262C and 262D.

The circuit 260Y2 is connected to the points 240C2 and 240D2 which are closer to the isolation resistor 150Y than the points 240C1 and 240D1 of the stubs 240C and 240D, for the following reasons. The circuit 260Y2 is provided on the same side as the merging lines 120C and 120D, with respect to the stubs 240C and 240D and the isolation resistors 150Y, the circuit 260Y2 is separated from the merging lines 120C and 120D as much as possible, so as to prevent or reduce the coupling between the circuit 260Y2 and the merging lines 120C and 120D. Further, the length of the lines 241C, 242C, 241D, and 242D of the stubs 240C and 240D is set longer than the length of the lines 243C, 244C, 243D, and 244D, so that the circuit 260Y2 is separated from the merging lines 120C and 120D as much as possible, thereby preventing or reducing the coupling between the circuit 260Y2 and the merging lines 120C and 120D. According to this configuration, the circuit 260Y2 is separated from the merging lines 120C and 120D.

The resonant circuit 270C1 is a circuit formed by the lines 241C and 242C of the stub 240C, and the line 261C, the capacitor 262C, and the ground terminal 163Y of the circuit 260Y1, and forms an LCL filter. In other words, the resonant circuit 270C1 has a function to attenuate the signal components near the desired resonant frequency. The reactance (L) included in the resonant circuit 270C1 is the reactance of the lines 241C and 242C and the line 261C, and the electrostatic capacitance (C) of the resonant circuit 270C1 is the electrostatic capacitance of the capacitor 262C.

The resonant circuit 270D1 is a circuit formed by the lines 241D and 242D of the stub 240D, and the line 261D, the capacitor 262D, and the ground terminal 163Y of the circuit 260Y1, and forms an LCL filter. In other words, the resonant circuit 270D1 has a function to attenuate the signal components near the desired resonant frequency. The reactance (L) included in the resonant circuit 270D1 is the reactance of the lines 241D and 242D and the line 261D, and the electrostatic capacitance (C) of the resonant circuit 270D1 is the electrostatic capacitance of the capacitor 262D.

In this example of the present embodiment, the resonant frequencies of the resonant circuits 270C1 and 270D1 are the same, because the reactances of the lines 241C, 242C, 241D, and 242D are all the same, the reactances of the lines 261C and 261D are the same, and the electrostatic capacitances of the capacitors 262C and 262D are the same. When the resonant frequency of the resonant circuits 270C1 and 270D1 are denoted by f1, the resonant circuits 270C1 and 270D1 have the function to attenuate the signal components near the resonant frequency f1. The resonant frequency f1 is an example of the first resonant frequency. The resonant frequency f1 of resonant circuits 270C1 and 270D1 is identical to the resonant frequency f1 of the resonant circuits 270A1 and 270B1, and the frequency band including the resonant frequency f1 of the resonant circuits 270C1 and 270D1 is identical to the frequency band including the resonant frequency f1 of the resonant circuits 270A1 and 270B1.

The resonant circuit 270C2 is a circuit formed by the lines 243C and 244C of the stub 240C, and the line 263C, the capacitor 264C, and the ground terminal 265Y of the circuit 260Y2, and forms an LCL filter. In other words, the resonant circuit 270C2 has a function to attenuate the signal components near the desired resonant frequency. The reactance (L) included in the resonant circuit 270C2 is the reactance of the lines 243C and 244C and the line 263C, and the electrostatic capacitance (C) of the resonant circuit 270C2 is the electrostatic capacitance of the capacitor 264C.

The resonant circuit 270D2 is a circuit formed by the lines 243D and 244D of the stub 240D, and the line 263D, the capacitor 264D, and the ground terminal 265Y of the circuit 260Y2, and forms an LCL filter. In other words, the resonant circuit 270D2 has a function to attenuate the signal components near the desired resonant frequency. The reactance (L) included in the resonant circuit 270D2 is the reactance of the lines 243D and 244D and the line 263D, and the electrostatic capacitance (C) of the resonant circuit 270D2 is the electrostatic capacitance of the capacitor 264D.

In the example of the present embodiment, the resonant frequencies of the resonant circuits 270C2 and 270D2 are the same, because the reactances of the lines 243C, 244C, 243D, and 244D are all the same, the reactances of the lines 263C and 263D are the same, and the electrostatic capacitances of the capacitors 264C and 264D are equal to each other. When the resonant frequency of the resonant circuits 270C2 and 270D2 is denoted by f2, the resonant circuits 270C2 and 270D2 have the function to attenuate the signal components near the resonant frequency f2. The resonant frequency f2 is an example of the second resonant frequency. The resonant frequency f2 of the resonant circuits 270C2 and 270D2 is identical to the resonant frequency f2 of the resonant circuits 270A2 and 270B2, and the frequency band including the resonant frequency f2 of the resonant circuits 270C2 and 270D2 is identical to the frequency band including the resonant frequency f2 of the resonant circuits 270A2 and 270B2.

[Operating Characteristics of Wilkinson Power Divider 200X]

Figure 12:
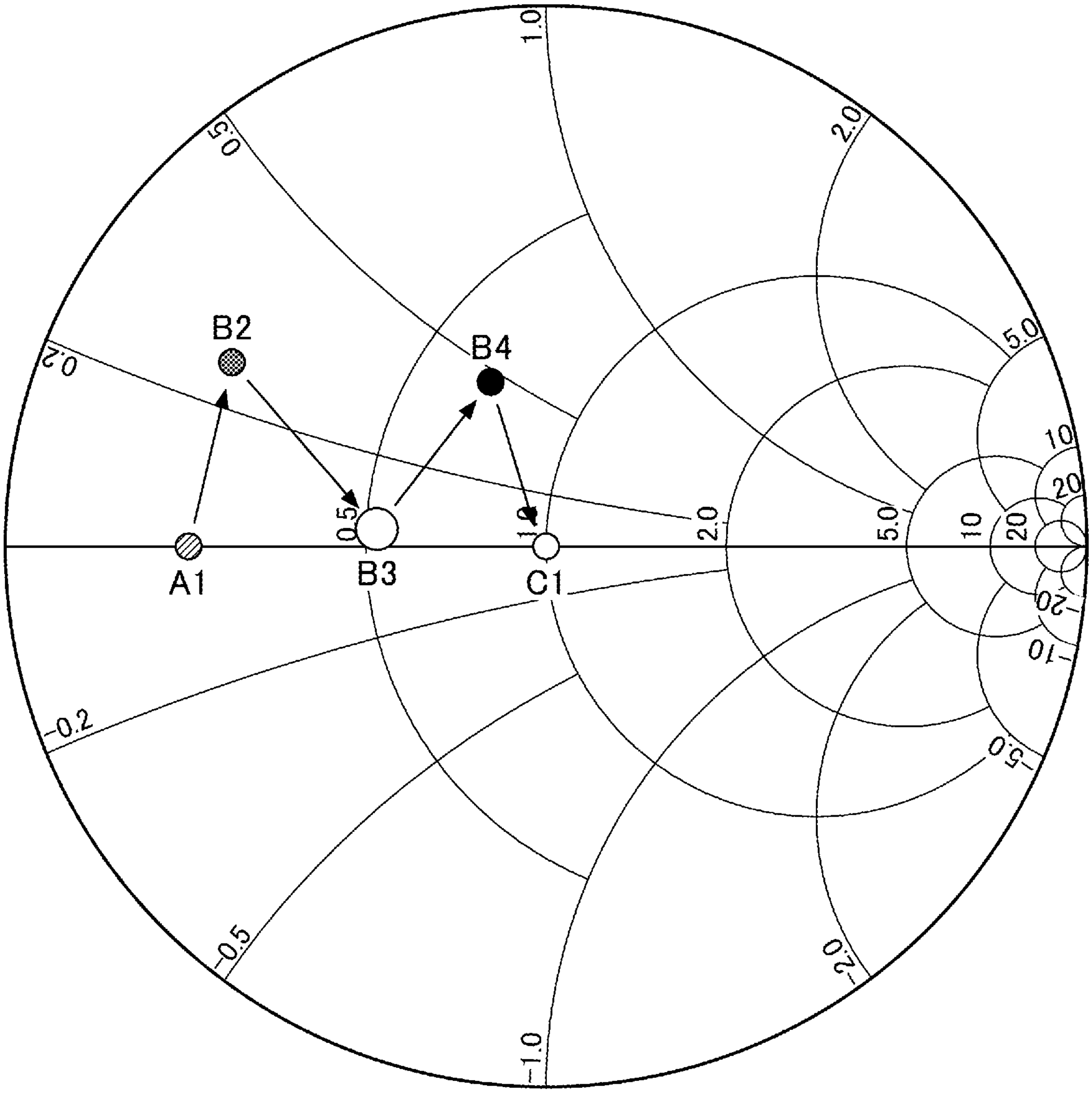
FIG. 12 is a Smith chart illustrating the impedance characteristic of the Wilkinson power divider according to the second embodiment.

FIG. 12 is a Smith chart illustrating the impedance characteristics of the Wilkinson power divider 200X. The Smith chart illustrated in FIG. 12 was obtained by electromagnetic field simulation. As illustrated in FIG. 12, it is possible to move from the point A1 which is approximately 0.2 on the real axis, to a point B2 along a constant resistance circle due to the reactances of the lines 241A and 242A of the stubs 240A, and the lines 241B and 242B of the stub 240B, of the resonant circuits 270A1 and 270B1. In addition, it is possible to move from the point B2 to a point B3 which is approximately 0.5 on the real axis, along a constant conductance circle due to the reactances of the lines 261A and 261B of the resonant circuits 270A1 and 270B1, and the capacitive impedances of the electrostatic capacitances of the capacitors 262A and 262B. Moreover, it is possible to move from the point B3 to a point B4 along a constant resistance circle due to the reactances of the lines 243A and 244A of the stub 240A, and the lines 243B and 244B of the stub 240B, of the resonant circuits 270A2 and 270B2. Further, it is possible to move from the point B4 to the point C1 which is approximately 1.0 on the real axis, along a constant conductance circle due to the reactances of the lines 263A and 263B of the resonant circuits 270A2 and 270B2, and the capacitive impedances of the electrostatic capacitances of the capacitors 264A and 264B. In the Wilkinson power divider 200X, it is possible to efficiently adjust the impedance at a position closer to the real axis than the Wilkinson power divider 100X according to the first embodiment, by utilizing the resonant circuits 270A1 and 270B1 and the resonant circuits 270A2 and 270B2.

Figure 13:
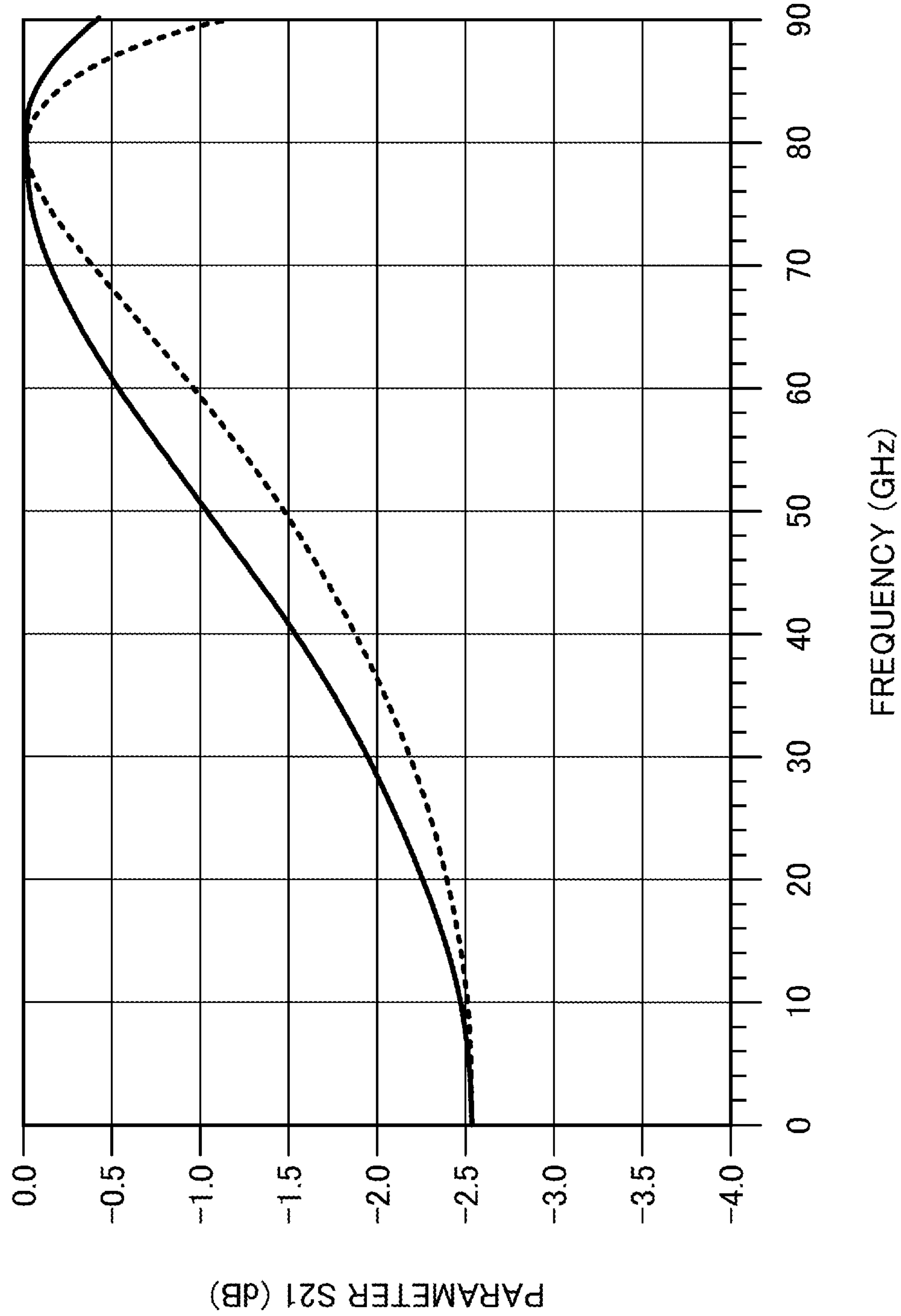
FIG. 13 is a diagram illustrating the frequency characteristic of the parameter S21 of the Wilkinson power divider according to the second embodiment.

FIG. 13 is a diagram illustrating the frequency characteristics of the parameter S21 of the Wilkinson power divider 200X. The parameter S21 illustrated in FIG. 13 was obtained by electromagnetic field simulation. In FIG. 13, the abscissa indicates the frequency (GHz), and the ordinate indicates the value (dB) of the parameter S21 (transmission coefficient). The parameter S21 illustrated in FIG. 13 indicates the passband characteristics from a node (port 2) between the isolation resistor 150X and the stub 240A, to the output end 122A (port 1). The parameter S21 of the Wilkinson power divider 200X is indicated by a solid line, and the parameter S21 of the Wilkinson power divider 100X according to the first embodiment illustrated in FIG. 2 is indicated by a dashed line. As illustrated in FIG. 13, it may be seen that the frequency band of the Wilkinson power divider 200X is broadened further than the Wilkinson power divider 100X according to the first embodiment.

Figure 14:
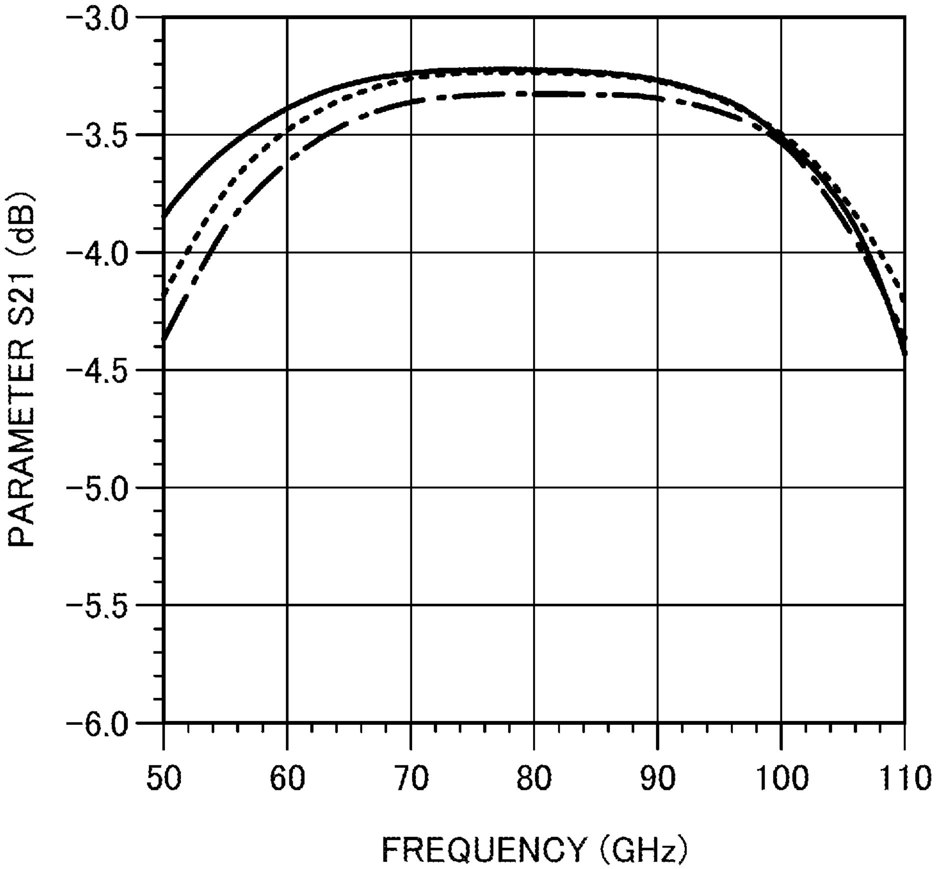
FIG. 14 is a diagram illustrating the frequency characteristic of the parameter S21 of the Wilkinson power divider according to the second embodiment.

FIG. 14 is a diagram illustrating the frequency characteristics of the parameter S21 of the Wilkinson power divider 200X. The parameter S21 illustrated in FIG. 14 was obtained by electromagnetic field simulation. The parameter S21 illustrated in FIG. 14 is the parameter S21 obtained by regarding the input terminal 111X as the port 1, and the output terminal 131A as the port 2. In other words, the parameter S21 illustrated in FIG. 14 indicates the power dividing characteristics of the transmission signal from the input terminal 111X to the output terminal 131A. In FIG. 14, the abscissa indicates the frequency (GHz), and the ordinate indicates the value (dB) of the parameter S21 (transmission coefficient).

In FIG. 14, the parameter S21 of the Wilkinson power divider 200X is indicated by a solid line, the parameter S21 of the Wilkinson power divider 100X according to the first embodiment is indicated by a dashed line, and the parameter S21 of the Wilkinson power divider according to the first comparative example is indicated by a one-dot chain line. The Wilkinson power divider according to the first comparative example is identical to that described using the Smith chart illustrated in FIG. 5 in comparison with the first embodiment.

When a comparison is made at −3.5 dB, for example, it may be seen that the frequency band of the Wilkinson power divider 200X is broadened by approximately 10 GHz compared to the frequency band of the Wilkinson power divider according to the first comparative example. The parameter S21 of the Wilkinson power divider 200X is less than or equal to −3.5 dB in the E-band, the frequency band including the resonant frequency f1, the frequency band (frequency band higher than 61 GHz and lower than 71 GHz) between the E-band and the frequency band including the resonant frequency f1, the frequency band including the resonant frequency f2, and the frequency band (frequency band higher than 86 GHz) between the E-band and the frequency band including the resonant frequency f2. This value of −3.5 dB is an example of the predetermined value of the transmission coefficient. As described above, it is possible to obtain a continuous frequency band in which the transmission coefficient is sufficiently large in the frequency band from a lowest frequency of the frequency band including the resonant frequency f1 up to a highest frequency of the frequency band including the resonant frequency f2, thereby enabling the frequency band of the Wilkinson power divider 200X to be broadened.

Figure 15:
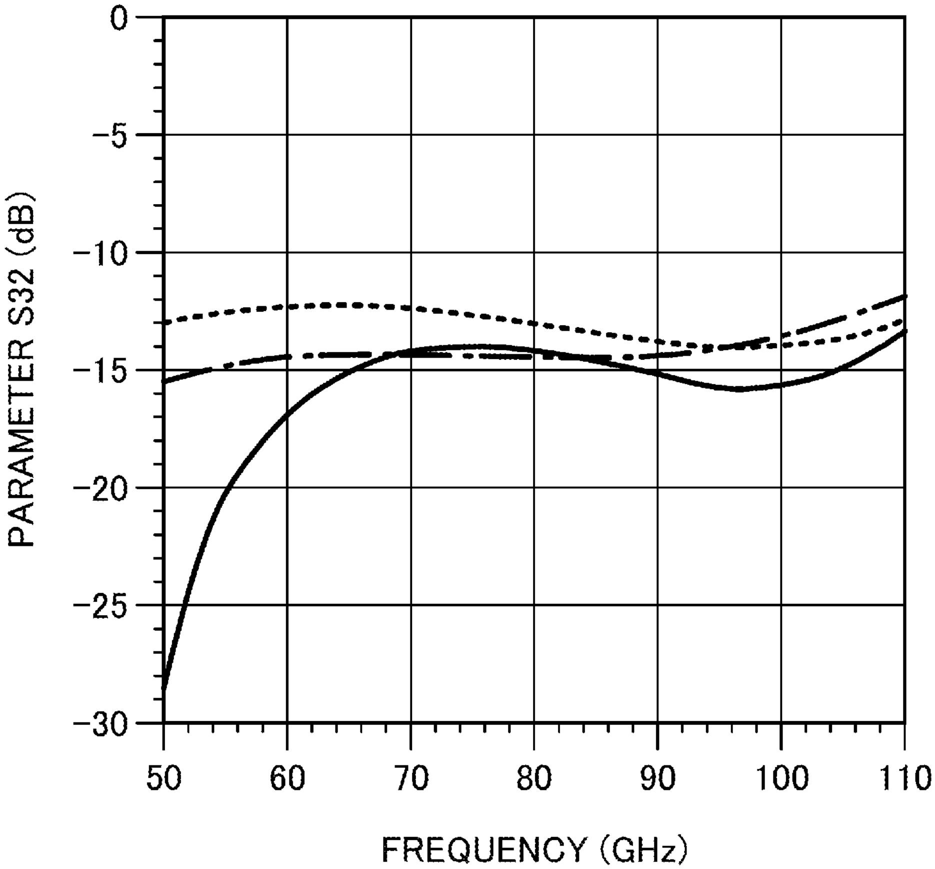
FIG. 15 is a diagram illustrating the frequency characteristic of the parameter S32 of the Wilkinson power divider according to the second embodiment.

FIG. 15 is a diagram illustrating the frequency characteristics of the parameter S32 of the Wilkinson power divider 200X. The parameter S32 illustrated in FIG. 15 was obtained by electromagnetic field simulation. In FIG. 15, the abscissa indicates the frequency (GHz), and the ordinate indicates the value (dB) of the parameter S32 (transmission coefficient). The parameter S32 illustrated in FIG. 15 indicates the transmission coefficient between a port 2 and a port 3, by regarding the output terminal 131A as the port 2, and the output terminal 131B as the port 3. In other words, the parameter S32 illustrated in FIG. 15 indicates the isolation characteristics between the port 2 and the port 3. In FIG. 15, the parameter S32 of the Wilkinson power divider 200X is indicated by a solid line, the parameter S32 of the Wilkinson power divider 100X according to the first embodiment is indicated by a dashed line, and the parameter S32 of the Wilkinson power divider according to the first comparative example is indicated by a one-dot chain line.

The parameter S32 of the Wilkinson power divider 200X, indicated by the solid line, has a value lower than that of the Wilkinson power divider 100X according to the first embodiment, indicated by the dashed line, in the entire frequency band, but is approximately the same as the parameter S32 of the Wilkinson power divider according to the first comparative example, indicated by the one-dot chain line, in a frequency band from approximately 70 GHz to approximately 85 GHz. However, in the frequency bands lower than or equal to approximately 70 GHz and higher than or equal to approximately 85 GHz, the parameter S32 of the Wilkinson power divider 200X, indicated by the solid line, has a value lower than that of the Wilkinson power divider according to the first comparative example, indicated by the one-dot chain line. It may be regarded that the excellent isolation characteristics of the Wilkinson power divider 200X are obtained, due to the resonant circuits 270A1 and 270B1, and the resonant circuits 270A2 and 270B2, which resonate in 2 kinds of frequency bands.

It was found that the frequency band of the Wilkinson power divider 200X can be broadened further than the Wilkinson power divider 100X according to the first embodiment, by including resonant circuits 270A1 and 270B1 which resonate in the frequency band from 56 GHz to 61 GHz, and the resonant circuits 270A2 and 270B2 which resonate in the frequency band from 96 GHz to 101 GHz, for example.

In the Wilkinson power divider 200X, it is possible to improve the isolation characteristics between the output end 122A and the output end 122B by the 2 LCL filters of the resonant circuits 270A1 and 270B1, and the 2 LCL filters of the resonant circuits 270A2 and 270B2, and improve the passband characteristics between the output end 122A and the output end 122B. In addition, the resonant circuits 270A1 and 270B1 resonate in the frequency band including resonant frequency f1, and the resonant circuits 270A2 and 270B2 resonate in the frequency band including resonant frequency f2. For this reason, the transmission signal in the frequency band including the E-band and the resonant frequency f1, and the transmission signal in the frequency band including the resonant frequency f2, assume opposite phases via the branching lines 120A and 120B between the output end 122A and the output end 122B and cancel each other, and the high frequency between the output end 122A and the output end 122B is equivalent to being terminated by 50Ω. According to such principles, the transmission signal in the frequency band including the E-band and the resonant frequency f1, and the transmission signal in the frequency band including the resonant frequency f2, input to the input terminal 111X, are branched by the branching lines 120A and 120B, and the transmission signals having the same phase are output from the output ends 122A and 122B to the output lines 130A and 130B, respectively. Accordingly, the broadband Wilkinson power divider 200X is obtained, which can transmit the transmission signal in the frequency band including the E-band and the resonant frequency f1, and the transmission signal in the frequency band including the resonant frequency f2.

In addition, because the Wilkinson power combiner 200Y illustrated in FIG. 11 performs an operation in which the input side and the output side of the Wilkinson power divider 200X are reversed, the frequency band can be broadened, similar to the Wilkinson power divider 200X. More particularly, the 2 transmission signals having the same phase and input to the input lines 130C and 131D, may be transmitted through the merging lines 120C and 120D, respectively, combined by reaching the output ends 121C and 121D with the same phase, and output from the output terminal 111Y via the output line 110Y. Such an operation may be performed similarly for the transmission signal in the E-band, the transmission signal in the frequency band including the resonant frequency f1, and the transmission signal in the frequency band including the resonant frequency f2.

Accordingly, it is possible to provide the Wilkinson power divider 200X, the Wilkinson power combiner 200Y, and the power amplifier including the Wilkinson power divider 200X and the Wilkinson power combiner 200Y, respectively having the broadened frequency band. The Wilkinson power divider 200X can more finely adjust the impedance, and further broaden the frequency band, by including the resonant circuits 270A1, 270B1, 270A2, and 270B2 in correspondence with the 2 kinds of frequency bands. In addition, the Wilkinson power combiner 200Y can more finely adjust the impedance, and further broaden the frequency band, by including the resonant circuits 270C1, 270D1, 270C2, and 270D2 in correspondence with the 2 kinds of frequency bands.

Moreover, in the Wilkinson power divider 200X, the lines 261A and 261B of the circuit 260X1 can be shortened, and the reactances of the lines 261A and 261B can be minimized, by utilizing the lines 241A and 242A of the stub 240A and the lines 241B and 242B of the stub 240B as portions of the reactances of the resonant circuits 270A1 and 270B1. In addition, it is possible to reduce the circuit scale of the circuit 260X1. Similarly, the lines 263A and 263B of the circuit 260X2 can be shortened, and the reactances of the lines 263A and 263B can be minimized, by utilizing the lines 243A and 244A of the stub 240A and the lines 243B and 244B of the stub 240B as portions of the reactances of the resonant circuits 270A2 and 270B2. Moreover, it is possible to reduce the circuit scale of the circuit 260X2.

Further, in the Wilkinson power divider 200X, the resonant circuits 270A1, 270B1, 270A2, and 270B2 are LCL filters, thereby reducing the generation of harmonics, and effectively improving isolation between the output end 122A and the output end 122B.

In the Wilkinson power combiner 200Y, lines 241C and 242C of stub 240C and lines 241D and 242D of stub 240D can be utilized as part of the reactance of resonant circuits 270C1 and 270D1 to shorten the lines 261C and 261D of circuit 260Y1 to minimize the reactance of the lines 261C and 261D. In addition, it is possible to reduce the circuit scale of the circuit 260Y1. Similarly, the lines 263C and 263D of the circuit 260Y2 can be shortened, and the reactances of the lines 263C and 263D can be minimized, by utilizing the lines 243C and 244C of the stub 240C and the lines 243D and 244D of the stub 240D as portions of the reactances of resonant circuits 270C2 and 270D2. Moreover, it is possible to reduce the circuit scale of the circuit 260Y2.

Further, in the Wilkinson power combiner 200Y, the resonant circuits 270C1, 270D1, 270C2, and 270D2 are LCL filters, thereby reducing the generation of harmonics, and effectively improving the isolation between the input end 122C and the input end 122D.

In the configuration of the second embodiment described above, the circuit 260X2 is disposed on the same side as the branching lines 120A and 120B, with respect to the stubs 240A and 240B and the isolation resistor 150X, and the circuit 260Y2 is disposed on the same side as the merging lines 120C and 120D, with respect to the stubs 240C and 240D and the isolation resistor 150Y. However, if a problem associated with coupling or the like will not occur, the circuit 260X1 may be disposed on the same side as the branching lines 120A and 120B, with respect to the stubs 240A and 240B and the isolation resistor 150X, and circuit 260Y1 may be disposed on the same side as the merging lines 120C and 120D, with respect to the stubs 240C and 240D and the isolation resistor 150Y. In this case, circuit 260X2 may be disposed on the opposite side from the branching lines 120A and 120B, with respect to the stubs 240A and 240B and the isolation resistor 150X, and circuit 260Y2 may be disposed on the opposite side from the merging lines 120C and 120D, with respect to the stubs 240C and 240D and the isolation resistor 150Y.

The Wilkinson power divider 200X including the resonant circuits 270A1 and 270B1, and the resonant circuits 270A2 and 270B2, which resonate in the 2 kinds of frequency bands, and the Wilkinson power combiner 200Y including the resonant circuits 270C1 and 270D1, and the resonant circuits 270C2 and 270D2, which resonate in the 2 kinds of frequency bands, are described above. However, the Wilkinson power divider 200X and the Wilkinson power combiner 200Y may include resonant circuits that resonate in three or more kinds of frequency bands.

According to the present disclosure, it is possible to provide a Wilkinson power divider, a Wilkinson power combiner, and an amplifiers having a broadened frequency band.

The present disclosure is not limited to the specific embodiments of the Wilkinson power divider, the Wilkinson power combiner, and the amplifier which are described in detail above, and various variations, modifications, and substitutions may be made within the scope of the present disclosure.

What is claimed is:

1. A Wilkinson power divider comprising:

an input line;

a first branching line and a second branching line branching from the input line;

a first output line coupled to a first end of an output side of the first branching line;

a second output line coupled to a second end of an output side of the second branching line;

a first stub coupled to the first end;

a second stub coupled to the second end;

an isolation resistor coupled between the first stub and the second stub; and a first circuit branching from a first point between two ends of the first stub, and a second point between two ends of the second stub, and coupling between the first point and the second point, wherein at least a first portion of the first stub, at least a first portion of the second stub, and the first circuit form a first resonant circuit, a first resonant frequency of the first resonant circuit is different from a center frequency of a transmission signal input to the input line, and a first frequency band, including the first resonant frequency, and in which the first resonant circuit resonates, is different from a frequency band including the center frequency of the transmission signal input to the input line.

2. The Wilkinson power divider as claimed in claim 1, wherein a transmission coefficient of the transmission signal in the frequency band including the center frequency, the first frequency band, and a frequency band between the frequency band including the center frequency and the first frequency band, is less than or equal to a predetermined value.

3. The Wilkinson power divider as claimed in claim 1, wherein the first circuit includes a first line coupling between the first point and the second point, and a first capacitor inserted in series with respect to the first line, and the first frequency band is determined by a reactance of at least the first portion of the first stub, at least the first portion of the second stub, and the first line, and an electrostatic capacitance of the first capacitor.

4. The Wilkinson power divider as claimed in claim 3, wherein the first resonant circuit is an LCL filter formed by at least the first portion of the first stub, at least the first portion of the second stub, the first line, and the first capacitor.

5. The Wilkinson power divider as claimed in claim 1, wherein the first point is a middle point between the two ends of the first stub, and the second point is a middle point between the two ends of the second stub.

6. The Wilkinson power divider as claimed in claim 1, wherein the first circuit is disposed on the same side as the first branching line and the second branching line, with respect to the first stub, the isolation resistor, and the second stub.

7. A Wilkinson power divider comprising:

an input line;

a first branching line and a second branching line branching from the input line;

a first output line coupled to a first end of an output side of the first branching line;

a second output line coupled to a second end of an output side of the second branching line;

a first stub coupled to the first end;

a second stub coupled to the second end;

an isolation resistor coupled between the first stub and the second stub;

a first circuit branching from a first point between two ends of the first stub, and a second point between two ends of the second stub, and coupling between the first point and the second point; and a second circuit branching from a third point between the two ends of the first stub, and a fourth point between the two ends of the second stub, and coupling between the third point and the fourth point, wherein at least a first portion of the first stub, at least a first portion of the second stub, and the first circuit form a first resonant circuit, and at least a second portion of the first stub other than the first portion of the first stub, at least a second portion of the second stub other than the first portion of the second stub, and the second circuit form a second resonant circuit.

8. The Wilkinson power divider as claimed in claim 7, wherein a second resonant frequency of the second resonant circuit is different from the center frequency of the transmission signal input to the input line.

9. The Wilkinson power divider as claimed in claim 8, wherein a second frequency band, including the second resonant frequency, and in which the second resonant circuit resonates, is different from a frequency band including the center frequency of the transmission signal.

10. The Wilkinson power divider as claimed in claim 1, further comprising:

a second circuit branching from a third point between the two ends of the first stub, and a fourth point between the two ends of the second stub, and coupling between the third point and the fourth point, wherein at least a second portion of the first stub other than the first portion of the first stub, at least a second portion of the second stub other than the first portion of the second stub, and the second circuit form a second resonant circuit which resonates in a second frequency band different from the frequency band including the center frequency, the frequency band including the center frequency is between the first frequency band and the second frequency band, and a transmission coefficient of the transmission signal in the frequency band including the center frequency, the first frequency band, the second frequency band, a frequency band between the frequency band including the center frequency and the first frequency band, and a frequency band between the frequency band including the center frequency and the second frequency band, is less than or equal to a predetermined value.

11. The Wilkinson power divider as claimed in claim 9, wherein the second circuit includes a second line coupling between the third point and the fourth point, and a second capacitor inserted in series with respect to the second line, and the second frequency band is determined by a reactance of at least the second portion of the first stub, at least the second portion of the second stub, and the second line, and an electrostatic capacitance of the second capacitor.

12. The Wilkinson power divider as claimed in claim 11, wherein the second resonant circuit is an LCL filter formed by at least the second portion of the first stub, at least the second portion of the second stub, the second line, and the second capacitor.

13. The Wilkinson power divider as claimed in claim 7, wherein the first circuit is disposed on the side opposite from the first branching line and the second branching line, with respect to the first stub, the isolation resistor, and the second stub, and the second circuit is disposed on the same side as the first branching line and the second branching line, with respect to the first stub, the isolation resistor, and the second stub.

14. The Wilkinson power divider as claimed in claim 13, wherein the two ends of the first stub include a first connection terminal coupled to the first end, and a third connection terminal coupled to the isolation resistor, the two ends of the second stub include a second connection terminal coupled to the second end, and a fourth connection terminal coupled to the isolation resistor, the first point and the third point are provided in this order from the first connection terminal to the third connection terminal, and the second point and the fourth point are provided in this order from the second connection terminal to the fourth connection terminal.

15. The Wilkinson power divider as claimed in claim 14, wherein a length between the first connection terminal and the first point is a first length corresponding to the first resonant frequency of the first resonant circuit, a length between the first point and the third point is a total length of the first length, and a second length corresponding to the second resonant frequency of the second resonant circuit, a length between the third point and the third connection terminal is the second length, a length between the second connection terminal and the second point is the first length, a length between the second point and the fourth point is a total length of the first length and the second length, and a length between the fourth point and the fourth connection terminal is the second length.

16. The Wilkinson power divider as claimed in claim 15, wherein the first length is longer than the second length.

17. An amplifier comprising:

a Wilkinson power divider including:

an input line, a first branching line and a second branching line branching from the input line, a first output line coupled to a first end of an output side of the first branching line, a second output line coupled to a second end of an output side of the second branching line, a first stub coupled to the first end, a second stub coupled to the second end, a first isolation resistor coupled between the first stub and the second stub, and a first circuit branching from a first point between two ends of the first stub, and a second point between two ends of the second stub, and coupling between the first point and the second point, wherein at least a first portion of the first stub, at least a first portion of the second stub, and the first circuit form a first resonant circuit;

a Wilkinson power combiner including:

an output line, a first merging line and a second merging line merging to the output line, a first input line coupled to a first input end of the first merging line, a second input line coupled to a second input end of the second merging line, a third stub coupled to the first input end, a fourth stub coupled to the second input end, a second isolation resistor coupled between the third stub and the fourth stub, and a third circuit branching from a fifth point between two ends of the third stub, and a sixth point between two ends of the fourth stub, and coupling between the fifth point and the sixth point, wherein at least a portion of the third stub, at least a portion of the fourth stub, and the third circuit form a third resonant circuit;

a first amplifier unit coupled between the first branching line and the first merging line; and a second amplifier unit coupled between the second branching line and the second merging line.

* * * * *